(12) United States Patent
Madabhushi et al.

(10) Patent No.: US 9,721,338 B2
(45) Date of Patent: Aug. 1, 2017

(54) METHOD AND APPARATUS FOR SEGMENTATION AND REGISTRATION OF LONGITUDINAL IMAGES

(75) Inventors: Anant Madabhushi, South Plainfield, NJ (US); Shannon C. Agner, Highland Park, NJ (US)

(73) Assignee: RUTGERS, THE STATE UNIVERSITY OF NEW JERSEY, New Brunswick, NJ (US)

(*) Notice: Subject to any disclaimer, the term of this patent is extended or adjusted under 35 U.S.C. 154(b) by 338 days.

(21) Appl. No.: 13/978,919

(22) PCT Filed: Jan. 9, 2012

(86) PCT No.: PCT/US2012/020636
§ 371 (c)(1),
(2), (4) Date: Nov. 18, 2013

(87) PCT Pub. No.: WO2012/096882
PCT Pub. Date: Jul. 19, 2012

(65) Prior Publication Data
US 2014/0064580 A1    Mar. 6, 2014

Related U.S. Application Data

(60) Provisional application No. 61/431,720, filed on Jan. 11, 2011, provisional application No. 61/435,203, filed on Jan. 21, 2011.

(51) Int. Cl.
*G06K 9/00* (2006.01)
*G06T 7/00* (2017.01)
(Continued)

(52) U.S. Cl.
CPC ............. *G06T 7/0012* (2013.01); *G06T 7/11* (2017.01); *G06T 7/149* (2017.01); *G06T 7/174* (2017.01);
(Continued)

(58) Field of Classification Search
None
See application file for complete search history.

(56) References Cited

U.S. PATENT DOCUMENTS 6,385,332 B1 * 5/2002 Zahalka ............... G06T 7/0012
128/922
8,442,285 B2 * 5/2013 Madabhushi et al. ........ 382/128
(Continued)

FOREIGN PATENT DOCUMENTS

WO    WO 2009058915 A1 *  5/2009 ............... G06T 7/00
WO    WO 2011031738 A1 *  3/2011

OTHER PUBLICATIONS

Sharma et al. "A Segmentation Method for Carotid Artery Atherosclerosis Plaque for MRI Contrast and MRI Features, Oxidative Stress Markers in Coronary and Carotid Plaque", Proceedings of the 16th IEEE Symposium on CBMS, 2003.*
(Continued)

*Primary Examiner* — Vu Le
*Assistant Examiner* — Samah Beg
(74) *Attorney, Agent, or Firm* — Fox Rothschild LLP

(57) ABSTRACT

The described invention provides systems and methods for detecting and segmenting a lesion from longitudinal, time series, or multi-parametric imaging by utilizing spectral embedding-based active contour (SEAC). In addition, the described invention further provides systems and methods for registering time series data by utilizing reduced-dimension eigenvectors derived from spectral embedding (SE) of feature scenes (SERg).

18 Claims, 13 Drawing Sheets

(51) Int. Cl.

| | |
|---|---|
| G06T 7/32 | (2017.01) |
| G06T 7/11 | (2017.01) |
| G06T 7/149 | (2017.01) |
| G06T 7/174 | (2017.01) |

(52) U.S. Cl.
CPC ...... *G06T 7/32* (2017.01); *G06T 2207/10096* (2013.01); *G06T 2207/20116* (2013.01)

(56) References Cited

U.S. PATENT DOCUMENTS

| | | | |
|---|---|---|---|
| 9,214,028 B2* | 12/2015 | Feilkas | G06T 7/0089 |
| 2001/0007940 A1 | 7/2001 | Tu et al. | |
| 2006/0176488 A1 | 8/2006 | McGraw | |
| 2006/0177125 A1* | 8/2006 | Chan et al. | 382/154 |
| 2007/0047788 A1 | 3/2007 | Slablaugh et al. | |
| 2007/0081706 A1 | 4/2007 | Zhou et al. | |
| 2008/0008369 A1* | 1/2008 | Koptenko et al. | 382/128 |
| 2008/0292194 A1* | 11/2008 | Schmidt et al. | 382/217 |
| 2009/0052756 A1* | 2/2009 | Saddi et al. | 382/131 |
| 2009/0067693 A1 | 3/2009 | Shinagawa et al. | |
| 2010/0091035 A1 | 4/2010 | Kirchberg et al. | |
| 2010/0111396 A1* | 5/2010 | Boucheron | 382/133 |
| 2011/0026798 A1* | 2/2011 | Madabhushi et al. | 382/131 |
| 2011/0158491 A1* | 6/2011 | Markova et al. | 382/128 |
| 2011/0295515 A1* | 12/2011 | Grady et al. | 702/19 |
| 2012/0106821 A1* | 5/2012 | Madabhushi et al. | 382/133 |
| 2012/0148123 A1* | 6/2012 | Gindele | 382/128 |
| 2012/0316421 A1* | 12/2012 | Kumar et al. | 600/407 |
| 2013/0177228 A1* | 7/2013 | Fan et al. | 382/131 |
| 2013/0202173 A1* | 8/2013 | Buckler et al. | 382/131 |
| 2013/0301889 A1* | 11/2013 | Abramoff et al. | 382/128 |
| 2013/0322728 A1* | 12/2013 | Jacobs et al. | 382/132 |
| 2015/0030219 A1* | 1/2015 | Madabhushi et al. | 382/128 |
| 2016/0364880 A1* | 12/2016 | Barratt | G06T 7/0089 |
| 2017/0035381 A1* | 2/2017 | Madabhushi | A61B 6/5217 |
| 2017/0039737 A1* | 2/2017 | Madabhushi | G06T 11/003 |

OTHER PUBLICATIONS

Staring et al. "Registration of cervical MRI using multifeature mutual information", IEEE 2009, pp. 1412-1421.*

Viswanath et al. "A Comprehensive Segmentation, Registration, and Cancer Detection Scheme on 3 Tesla In Vivo Prostate DCE-MRI", MICCAI 2008, pp. 662-669.*

Muñoz, X., Freixenet, J., Cufi, X., & Marti, J. (2003). Strategies for image segmentation combining region and boundary information. Pattern recognition letters, 24(1), 375-392.*

Paragios, N., & Deriche, R. (2002). Geodesic active regions and level set methods for supervised texture segmentation. International Journal of Computer Vision, 46(3), 223-247.*

Ali, S., & Madabhushi, A. (2012). An integrated region-, boundary-, shape-based active contour for multiple object overlap resolution in histological imagery. IEEE transactions on medical imaging, 31(7), 1448-1460.*

Written Opinion of the International Searching Authority for Application No. PCT/US2012/020636, dated Jul. 11, 2013.

International Search Report for Application No. PCT/US2012/020636, dated May 3, 2012.

Agner, et al., "Textural Kinetics: A Novel Dynamic Contrast-Enhanced (DCE)-MRI Feature for Breast Lesion Classification," J. Digital Imaging, (2011) vol. 24, Issue 3, pp. 446-463.

Agner, et al., "Spectral embedding-based active contour (SEAC): application to breast lesion segmentation on DCE-MRI," (2011) SPIE 7963, Medical Imaging 2011: Computer-Aided Diagnosis, 796305 (Abstract only).

Bhooshan et al., "Cancerous Breast Lesions on Dynamic Contrast-enhanced MR Images: Computerized Characterization for Image-based Prognostic Markers," Radiology, (2010) vol. 254, Issue 3, pp. 680-690.

Bookstein, F., "Principal Warps: Thin-Plate Splines and teh Decomposition of Deformations," IEEE PAMI, (1989) vol. 11, Issue 6, pp. 567-585.

Bradley et al., "The effect of variation in slice thickness and interslice gap on MR lesion detection," American Journal of Neuroradiology, (1987) vol. 8, Issue 6, pp. 1057-1062 (Abstract only).

Caselles et al., "Geodesic Active Contours," International Journal of Computer Vision, (1997) vol. 22, pp. 61-79 (Abstract only).

Chan et al., "Active Contours Without Edges," Image Processing, IEEE Transactions on 10, (2001) pp. 266-277 (Abstract only).

Chan et al., "Active Countours without Edges for Vector-Valued Images," Journal of Visual Communication and Image Representation, (2000) vol. 11, Issue 2, pp. 130-141.

Chen et al., "Automatic identification and classification of characteristic kinetic curves of breast lesions on DCE-MRI," Medical Physics, (2006) vol. 33, Issue 8, pp. 2878-2887 (Abstract only).

Cohen, L., "On Active Countour Models and Balloons," CVGIP: Image Understanding, (1991) vol. 53, Issue 2, pp. 211-218.

Cortes et al., "Support-Vector Networks," Machine Learning, (1995) vol. 20, Issue 3, pp. 273-297.

Di Zenzo, S., "A Note on the Gradient of a Multi-Image," Computer Vision, Graphics, and Image Processing, (1986) vol. 33, pp. 116-125.

Eyal et al., "Principal component analysis of breast DCE-MRI adjusted with a model-based method," J Magn Reson Imaging, (2009) vol. 30, pp. 989-998.

Fatakdawala et al., "Expectation-Maximization-Driven Geodesic Active Contour With Overlap Resolution (EMaGACOR): Application to Lymphocyte Segmentation on Breast Cancer Histopathology," Biomedical Engineering, IEEE, (2010) vol. 57, Issue 7, pp. 1676-1689 (Abstract only).

Gilhuijs et al., "Computerized analysis of breast lesions in three dimensions using dynamic magnetic-resonance imaging," Medical Physics, (1998) vol. 25, Issue 9, pp. 1647-1654 (Abstract only).

Glover et al., "Nonlinear partial volume artifacts in x-ray computed tomography," Med Phys., (1980) vol. 7, Issue 3, pp. 238-248 (Abstract only).

Hamarneh et al., "Perception-based Visualization of Manifold-Valued Medical Images using Distance-Preserving Dimensionality Reduction," Medical Imaging, IEEE Transactions on, (2011) vol. 30, Issue 7, pp. 1314-1327.

Ikeda et al., "Development, standardization, and testing of a lexicon for reporting contrast-enhanced breast magnetic resonance imaging studies," Journal of Magnetic Resonance Imaging, (2001) vol. 13, pp. 889-895 (Abstract only).

Jamieson et al., "Exploring nonlinear feature space dimension reduction and data representation in breast Cadx with Laplacian eigenmaps and t-SNE," Med Phys, (2010) vol. 37, pp. 339-351.

Jolliffe, I., "Principal component analysis," 2nd ed., Springer series in statistics, Springer-Verlag, New York (2002).

Kass et al., "Snakes: Active Contour Models," International Journal of Computer Vision, (1988) vol. 1, Issue 4, pp. 321-331.

Kinkel et al., "Dynamic High-Spatial-Resolution MR Imaging of Suspicious Breast Lesions," Am. J. Roentgenol., (2000), vol. 175, Issue 1, pp. 35-43.

Kwan et al., "MRI simulation-based evaluation of image-processing and classification methods," IEEE Transactions on Med. Imaging (1999) vol. 18, Issue 11, pp. 1085-1097 (Abstract only).

Lee et al., "Investigating the efficacy of nonlinear dimensionality reduction schemes in classifying gene and protein expression studies," IEEE/ACM Transactions on Computational Biology and Bioinformatics, (2008) vol. 5, pp. 368-384 (Abstract only).

Li et al., "Level set evolution without re-initialization: a new variational formulation," 2005 IEEE Computer Society Conference on Computer Vision and Pattern Recognition (CVPR'05), vol. 1—vol. 01, CVPR '05, pp. 430-436 (Abstract only).

Madabhushi et al., "Generalized scale: Theory, algorithms, and application to image inhomogeneity correction," Computer Vision and Image Understanding, (2006) vol. 101, Issue 2, pp. 100-121 (Abstract only).

(56) References Cited

OTHER PUBLICATIONS

Madabhushi et al., "New methods of MR image intensity standardization via generalized scale," Medical Physics, (2006) vol. 33, Issue 9, pp. 3426-3434 (Abstract only).
Meila et al., "A Random Walks View of Spectral Segmentation," (2001).
Neeumuchwala et al., "Image matching using alpha-entropy measures and entropic graphs," Journal of Signal Processing, (2005) vol. 85, pp. 277-296 (Abstract only).
Nyul et al., "Incorporating a measure of local scale in voxel-based 3-D image registration," IEEE Trans Med Imaging, (2003) vol. 22, Issue 2, pp. 228-237 (Abstract only).
Punam, K. et al., "Scale-Based Fuzzy Connected Image Segmentation: Theory, Algorithms, and Validation," Computer Vision and Image Understanding, (2000) vol. 77, Issue 2, pp. 145-174 (Abstract only).
Roche et al., "The correlation ratio as a new similarity measure for multimodal image registration," MICCAI'98, Lecture Notes in Computer Science 496, (1998), pp. 1115-1124 (Abstract only).
Rorden et al., "Stereotaxic display of brain lesions," Behav Neurol, (2000) vol. 12, Issue 4, pp. 191-200 (Abstract only).
Rousson et al., "A variational framework for active and adaptative segmentation of vector valued images," Motion and Video Computing, Workshop on, 2002 Proceedings, (Dec. 2002) pp. 56-61 (Abstract only).
Rueckert et al., "Nonrigid registration using free-form deformations: application to breast MR images," IEEE Trans Med Imaging, (2009) vol. 18, Issue 8, pp. 712-721 (Abstract only).
Saha, P. "Tensor scale: a local morphometric parameter with applications to computer vision and image processing," Computer Vision and Image Understanding, (2005) vol. 99, Issue 3, pp. 384-413 (Abstract only).
Saha et al., "Scale-based diffusive image filtering preserving boundary sharpness and fine structures," IEEE Transactions Med Imaging, (Nov. 2001) vol. 20, Issue 11, pp. 1140-1155 (Abstract only).
Saha et al., "Tensor scale-based image registration," SPIE, (2003) vol. 5032, pp. 314-324 (Abstract only).
Sapiro, G. "Color snakes," Computer Vision and Image Undrstanding, (1997) vol. 68, Issue 2, pp. 247-253 (Abstract only).
Schnall et al., "Diagnostic architectural and dynamic features at breast MR imaging: multicenter study," Radiology, (2006) vol. 238, Issue 1, pp. 42-53.
Shi et al., "Treatment response assessment of breast masses on dynamic contrast-enhanced magnetic resonance scans using fuzzy c-means clustering and level set segmentation," Medical Physics, (2009) vol. 36, Issue 11, pp. 5052-5063.
Shi et al., "Normalized Cuts and Image Segmentation," IEEE Transactions on Pattern Analysis and Machine Intelligence, (2000) vol. 22, Issue 8, pp. 888-905 (Abstract only).
Staring et al., "Registration of Cervical MRI Using Multifeature Mutual Information," IEEE Trans. Med. Imag. (2009) vol. 28, Issue 9, pp. 1412-1421 (Abstract only).
Szabó et al., "Neural network approach to the segmentation and classification of dynamic magnetic resonance images of the breast: Comparison with empiric and quantitative kinetic parameters 1," Academic Radiology, (2004) vol. 11, pp. 1344-1354 (abstract only).
Weiss, Y., "Segmentation using eigenvectors: a unifying view," Computer Vision, 1999, The Proceedings of the Seventh IEEE International Conference, (1999) vol. 2, pp. 975-982 (Abstract only).
Wu et al., "Improved method for correction of systematic bias introduced by the sub-voxel image registration process in functional magnetic resonance imaging," SPIE, (2006) vol. 6144, p. 61444M.
Xu et al., "A high-throughput active contour scheme for segmentation of histopathological imagery," Medical image analysis, (Dec. 2011) vol. 15, Issue 6, pp. 851-862.

\* cited by examiner

METHOD AND APPARATUS FOR SEGMENTATION AND REGISTRATION OF LONGITUDINAL IMAGES

CROSS REFERENCE TO RELATED APPLICATIONS

This application is the U.S. National Phase of International Patent Application Serial No. PCT/US2012/020636, filed Jan. 9, 2012, which claims the benefit of priority to U.S. Provisional Application No. 61/431,720, filed Jan. 11, 2011, entitled "METHOD AND APPARATUS FOR SEGMENTATION AND REGISTRATION OF LONGITUDINAL IMAGES" and U.S. Provisional Application No. 61/435,203, filed Jan. 21, 2011, entitled "METHOD AND APPARATUS FOR SEGMENTATION AND REGISTRATION OF LONGITUDINAL IMAGES". The content of each of these applications is incorporated by reference herein in its entirety.

STATEMENT REGARDING FEDERALLY SPONSORED RESEARCH OR DEVELOPMENT

This invention was made with Government support under grant numbers R01CA136535-01; R03CA143991-01; R01CA140772-01; and R21CA127186-01, awarded by the National Institutes of Health. The government has certain rights in the invention.

FIELD OF INVENTION

The described invention relates to systems and methods for detecting and segmenting a lesion from longitudinal, time series, or multi-parametric imaging by using spectral embedding-based active contour (SEAC) and for registering time series data using spectral embedding (SE) of feature scenes.

BACKGROUND OF INVENTION

1. Spectral Embedding-Based Active Contour (SEAC) for Lesion Segmentation

Spectral Embedding (SE)

Spectral embedding (SE), a graph-based manifold learning method, has been shown to be useful in high dimensional data classification. SE is used to cluster image pixels based on their similarity to provide an alternative data representation to a multidimensional image. The SE image representation has the ability to visualize the information of greater than two dimensions at each pixel location based on its similarity to other pixels in the image, and the output of SE is an orthonormal basis of eigenvectors such that the information in each eigenvector is independent, yet captures the fundamental patterns in the image. The output of SE can be used to segment, or delineate, a region of interest (ROI) in the image from non-ROI areas in the image. It can also be used to register, or align, images based on a set of features calculated at each pixel location in the image.

Active Contour (AC)

Active contour (AC) methods are commonly used for medical image segmentation. While AC methods are often successful in object segmentation, their success hinges upon the existence of strong signal intensity gradients at the interface between the region of interest and its surrounding structures. This is often a disadvantage of the AC model and poses a particularly difficult problem for grayscale images such as those found in radiologic images. Because radiologic images are composed of subtle changes in grayscale signal intensity, a strong gradient can be difficult to define, particularly when the region of interest has diffuse boundaries. In addition, in time-series data such as dynamic contrast enhancement magnetic resonance imaging (DCE-MRI), the question of which time point to use for lesion segmentation poses a difficult problem.

In general, AC models can either be boundary-based or region-based (Chan, T. and Vese, L., Image Processing, IEEE Transactions on 10, pp. 266-277, 2001). One of the key components of a boundary-based AC model is the energy term, which requires strong gradients at the boundary between the region of interest (ROI) and the background. Since the boundary of the ROI does not always have a strong gradient, alternative methods to derive the energy term have been explored. Gradient vector flow was proposed to incorporate the gradient field of the image into the energy term so that when the magnitude of gradient field was small, the partial derivative dominates the term, whereas the gradient field magnitude dominates the energy term when its magnitude is large.

Manifold learning based schemes like spectral embedding (SE) allow for parametrically representing high dimensional data in an alternative embedding space. However, while several researchers have explored SE for data classification (Eyal, E. et al., J Magn Reson Imaging 30, 989-998, 2009; Jamieson, A. et al., Med Phys, 37, 339-351, 2010; Lee, G. et al., IEEE/ACM Transactions on Computational Biology and Bioinformatics 5, 368-384, 2008), few studies have addressed alternative data representations for facilitating segmentation of time dependent MRI such as DCE-MRI. Eyal et al. (J Magn Reson Imaging 30, 989-998, 2009) used the principal eigenvectors derived from principal component analysis (PCA) to determine a parametric representation of breast DCE-MRI data. Since the feature matrix in PCA is a covariance matrix, transforming data in the PCA space and using the eigenvectors associated with the largest eigenvalues rotates the data along axes of maximum variance. Thus, if one were to use the PCA eigenvectors as the gradient functional, the stopping criterion would be based on a gradient of deviation from the mean, which would not provide a strong gradient. In contrast, SE uses the eigenvectors corresponding to the minimum eigenvalues based on the eigenvalue decomposition of a weighted similarity matrix, providing an intuitive strong gradient for the AC. In addition, the SE transformed eigenvectors not only preserve both local and global similarities, but also are orthonormal to another so that each eigenvector contains independent information.

Lesion Segmentation on Breast Dynamic Contrast Enhanced Magnetic Resonance Imaging (DCE-MRI)

Breast lesion segmentation is an important pre-processing step in a computer aided diagnosis framework for breast dynamic contrast enhanced (DCE) magnetic resonance imaging (MRI). Several studies have shown that quantitative morphological features extracted from breast lesions are helpful for distinguishing between benign and malignant breast lesions. (Ikeda D. et al., Journal of Magnetic Resonance Imaging, 13:889-895, 2001; Schnall, M. et al., Radiology, 238(1):42-53, 2006.). Typically, a radiologist's expert delineation of the lesion boundary is considered the gold standard for lesion segmentation. However, manual segmentation is notoriously susceptible to inter-rater variability in breast MRI interpretation (Ikeda D. et al., Journal of Magnetic Resonance Imaging, 13:889-895, 2001; Kinkel, K. et al., Am. J. Roentgenol., 175(1):35-43, 2000) and is extremely time consuming.

Because accurate lesion segmentation is time consuming, yet necessary for quantitative lesion analysis, many groups have explored various automated segmentation methods for breast dynamic contrast-enhanced magnetic resonance imaging (DCE-MRI) (Chen, W. et al., Medical Physics, 33(8):2878-2887, 2006; Shi et al., Medical Physics, 36(11): 5052-5063, 2009; Botond, K. et al., Academic Radiology, 11:1344-1354, 2004; Twellmann, T. et al., Eng. Appl. Artif. Intell., 21:129-140, 2008; Wu, Q., et al., SPIE, volume 6144, page 61444M. 2006.). Automated lesion segmentation methods for breast dynamic contrast-enhanced magnetic resonance imaging (DCE-MRI) have been explored mostly in the context of pixel-wise clustering of the data. Szabo et al. (Szabo, B. et al, Academic Radiology, 11:1344-1354, 2004) used a pixel-wise classifier that used dynamic contrast signal intensities in conjunction with an artificial neural network to identify lesion areas of interest. Other methods that have also used pixel-wise classifiers for segmentation include Twellmann et al. (Twellmann, T. et al., Eng. Appl. Artif. Intell., 21:129-140, 2008), who used the dynamic contrast signal intensities in conjunction with a support vector machine (SVM) classifier and Chen et al (Chen, W. et al., Medical Physics, 33(8):2878-2887, 2006.), who used a fuzzy c-means (FCM) clustering scheme. Additionally, Wu et al. (SPIE, volume 6144, page 61444M, 2006) clustered the time-series data of breast dynamic contrast-enhanced magnetic resonance imaging (DCE-MRI) using Markov random fields. Although these pixel-wise methods are reasonably effective, most require post-processing morphological operations, such as hole-filling and dilation, in order to provide a closed contour for the lesion of interest.

An alternative to pixel-wise methods are shape-based deformable models, most popular of which is the active contour (AC) model (Caselles, V. et al., International Journal of Computer Vision, 22:61-79, 1997. 10.1023/A: 1007979827043; Chan, T. and Vese, L., Image Processing, IEEE Transactions on, 10(2):266-277, February 2001; Tony, F. et al., Journal of Visual Communication and Image Representation, 11(2):130-141, 2000; Kass, M. et al., International Journal of Computer Vision, 1(4):321-331, 1988; Rousson, M and Deriche, R., In Motion and Video Computing, 2002. Proceedings. Workshop on, pages 56-61, December 2002; Sapiro, G. Color snakes. CVIU, 68(2):247-253, 1997; Xu, J. et al., Medical Image Analysis, In Press: Corrected Proof, 2011).

The theory of the active contour (AC) model, introduced by Kass et al. (International Journal of Computer Vision, 1(4):321-331, 1988), is that (1) the segmentation of any object of interest (OOI) in an image, whose edges can be described by a closed curve, is equivalent to the location of edges, or sharp intensity gradients; and (2) this segmentation can be generated by iteratively deforming a curve towards the edges of the object of interest (OOI). Traditional AC models have been typically classified as: (1) boundary-based (Caselles, V. et al., International Journal of Computer Vision, 22:61-79, 1997; Kass, M. et al., International Journal of Computer Vision, 1(4):321-331, 1988), such as the AC described by Kass et al. International Journal of Computer Vision, 1(4):321-331, 1988), or (2) region-based methods (Chan et al., Image Processing, IEEE Transactions on, 10(2):266-277, February 2001.). However, to use an AC model, an image representation that is conducive to the stopping criteria of the curve evolution is necessary. For example, boundary-based methods require strong gradients located at the boundary of the object of interest (OOI) to provide an effective stopping criterion for the evolving AC model. For radiologic imaging applications involving MRI or computed tomography (CT) data, boundary-based methods may not be effective since image acquisition artifacts, such as partial volume effects (Bradley, W. and Glenn, B., American Journal of Neuroradiology, 8(6):1057-62, 1987; Glover, G. and Pelc, N., Nonlinear partial volume artifacts in x-ray computed tomography, 7(3):238-248, 1980) and a low signal to noise ratio, may result in fuzziness of the object boundary, preventing boundary-based AC models from having appropriate stopping criteria. Region-based methods rely on the image statistics of foreground and background regions in the image. Hence, a grayscale radiologic image may not provide a large enough difference between foreground and background image statistics to provide an effective stopping criterion for a region-based AC either. Consequently, there is a need to find alternative image representations that can provide (1) strong gradients at the margin of the object of interest; and (2) larger separation between intensity distributions and region statistics for the foreground and the background which would cause the AC to stop evolving at the border of the OOI.

Alternative image representations have been explored for noise filtering (Saha, P. and Udupa, J., Medical Imaging, IEEE Transactions on, 20(11):1140-1155, November 2001), image registration (Nyul, L. et al., IEEE Trans Med Imaging, 22(2):228-237, 2003), and fuzzy connectedness based image segmentation (Punam, K. et al., Computer Vision and Image Understanding, 77(2):145-174, 2000). Nyul et al. (IEEE Trans Med Imaging, 22(2):228-237, 2003) employed ball-scale for multi-protocol image registration, where ball-scale (IEEE Trans Med Imaging, 22(2):228-237, February 2003) is a locally adaptive scale definition such that every image pixel location is parametrized by the radius of the largest ball that satisfies some pre-defined local homogeneity criterion. Saha (Computer Vision and Image Understanding, 99(3): 384-413, 2005) defined tensor scale (t-scale) at every spatial location as the largest ellipse that satisfies some pre-defined homogeneity criterion. The t-scale based representation has been employed in the context of image segmentation and image filtering (Saha, P. et al., Tensor scale-based image registration. volume 5032, pages 314-324. SPIE, 2003; Saha, P. et al., Computer Vision and Image Understanding, 99(3):384-413, 2005)

The generalized scale (g-scale) (Madabhushi, A. et al., Computer Vision and Image Understanding, 101(2):100-121, 2006) has also been applied similarly to bias field correction (Madabhushi, A. et al., Computer Vision and Image Understanding, 101(2):100-121, 2006), noise filtering (40), and intensity standardization (Madabhushi, A. et al., Medical Physics, 33(9):3426-3434, 2006). In each of these methods, transforming the data into another image space allowed for an improvement in the corresponding image processing task.

Nonlinear dimensionality reduction (NLDR) is a computational method that transforms data from a high-dimensional space to a more manageable, low-dimensional space and can be particularly powerful in data visualization (Hamarneh, G. et al., Medical Imaging, IEEE Transactions on, 30(7):1314-1327, 2011) and classification (Eyal, E. et al., J Magn Reson Imaging, 30(5):989-998, 2009; Jamieson, A. et al., Med Phys, 37(1):339-351, 2010; Lee, G. et al., IEEE/ACM Transactions on Computational Biology and Bioinformatics, 5:368-384, 2008). Spectral embedding (SE), a type of NLDR, uses the eigenvectors corresponding to the minimum eigenvalues derived from the eigenvalue decomposition of a weighted affinity matrix (Shi, J. and Malik, J., IEEE PAMI, 22(8):888-905, 2000), where the affinity matrix represents the pairwise dissimilarity between all the objects to be classified, obtained via a Gaussian, exponential, or polynomial kernel in the original feature space. SE also allows for parametrically representing high dimensional data in a reduced dimensional space, and several researchers have employed SE in the context of image partitioning (Meila, M. and Shi, J., A random walks view of spectral segmentation. 2001; Shi, J. and Malik, J., IEEE PAMI, 22(8):888-905, 2000), clustering (Weiss, Y., Computer Vision, IEEE International Conference on, 2:975, 1999), and segmentation. Application of SE to time series or longitudinal data may allow for better capture and representation of both region and boundary-based statistics. In addition, improved region and boundary statistics in turn may allow for construction of improved hybrid active contour schemes. However, no attempts have been made to explore the utility of nonlinear dimensionality reduction (NLDR) schemes to seek improved image representations that would be amenable for use in conjunction with an AC based segmentation scheme.

The traditional active contour (AC) operates on the scalar grayscale image intensities. However, time series data, such as dynamic contrast-enhanced magnetic resonance imaging (DCE-MRI), contains multiple time points over which the image of the lesion of interest is captured. Typically, if a traditional AC is used, only a single time point (usually the time point at which the lesion maximally enhances) is used for segmentation. However, implementations of the AC model have been developed for multi-dimensional images (Tony, F. et al., Journal of Visual Communication and Image Representation, 11(2):130-141, 2000; Rorden, C. and Brett, M., Behav Neurol, 12(4):191-200, 2000; Sapiro, G., CVIU, 68(2):247-253, 1997; Xu, J. et al., Medical Image Analysis, In Press: Corrected Proof, 2011). Chan et al. (Journal of Visual Communication and Image Representation, 11(2): 130-141, 2000) demonstrated an extension of the original scalar image based AC model applied to vector-valued images. Rousson and Deriche (In Motion and Video Computing, 2002. Proceedings. Workshop on, pages 56-61, December 2002) also demonstrated a vector-valued active contour. In a recent application to a histological medical imaging problem, Xu et al. (Medical Image Analysis, In Press: Corrected Proof, 2011) developed a tensor gradient based AC for use with histopathological images by computing the gradient from vectorial images, and hence representing the image gradient as tensors. Xu et al. (Medical Image Analysis, In Press: Corrected Proof, 2011) showed that the tensor gradient more completely captured the gradient information in a multi-channel image than using a single channel of the image, yielding a more discriminating AC scheme.

Spectral embedding (SE) aims to partition the data points in a way that maximizes intra-cluster similarity while simultaneously minimizing inter-cluster similarity (Shi, J. and Malik, J., IEEE PAMI, 22(8):888-905, 2000), and the eigenvectors are oriented along the directions of fundamental patterns in the data. In the context of dynamic contrast-enhanced magnetic resonance imaging (DCE-MRI), these fundamental patterns are related to the time-intensity curves at each pixel in the image, and the time-intensity curves from lesion and non-lesion areas tend to have different characteristics as previously shown in multiple different studies (Chen, W. et al., Medical Physics, 33(8):2878-2887, 2006; Botond, K. et al., Academic Radiology, 11:1344-1354, 2004).

Therefore, by applying SE across all pixels in an image, the described invention aims to characterize pixels according to their time-intensity curves, an approach that has not been taken before with respect to dynamic contrast-enhanced magnetic resonance imaging (DCE-MRI) data. In addition, pixel similarity is reflected by the eigenvectors at each pixel such that pixels with similar eigenvector values have similar time-intensity curves. Since this is performed in a pixel-wise fashion, the image scene composed of the eigenvector values reflect region similarities and global differences in the images (see FIG. 1).

This alternative image scene information driven by the intensity profiles provides greater knowledge for approximating the region statistics of the image via SE's ability to preserve global data information (Shi, J. and Malik, J., IEEE PAMI, 22(8):888-905, 2000). Similarly, the alternative image scene information resulting from SE provides better boundary information by preserving the local image information as well as constraining the data in such a way that the distances between pixel clusters with different time-intensity curve profiles will be maximized. Recently, Eyal et al. (J Magn Reson Imaging, 30(5):989-998, November 2009) used the principal eigenvectors derived from principal component analysis (PCA) to determine a parametric representation of breast dynamic contrast-enhanced magnetic resonance imaging (DCE-MRI) data for lesion classification.

2. Spectral Embedding-Based Registration (SERg) for Time Series Imaging

Alternative data representations for improved registration accuracy and efficiency have been explored with the idea that two images in the transformed space may be more similar than the corresponding images in the raw intensity space. Nyul et al. (EEE Trans. Med. Imag. 22(2), 228-237, 2003) used the ball-scale concept, where a ball of a certain radius defined a region of homogeneity in an image, to drive registration. Similarly, Saha (Tensor scale-based image registration. Volume 5032., SPIE, 314-324, 2003) demonstrated the effectiveness of tensor scale (t-scale), whereby an ellipsoid defines the region of homogeneity, to improve image registration.

Although alternative data representations have been developed previously primarily for motion correction, time-series data involving dynamic contrast enhancement (DCE) introduces another difference between target and template images, i.e., changes in contrast. Since the post-contrast images are registered typically to pre-contrast images, comparing images whose dynamic intensity ranges change from time point to time point on the basis of signal intensity is not an appropriate method for dynamic contrast enhanced (DCE) data. This is illustrated in FIG. 9, which shows the subtraction images of a dynamic contrast-enhanced magnetic resonance imaging (DCE-MRI) of the breast with and without intensity based registration at three different time points.

SUMMARY OF THE INVENTION

According to one aspect, the described invention provides a method for detecting and segmenting a lesion from longitudinal, time series, or multi-parametric imaging by utilizing spectral embedding-based active contour (SEAC), the method comprising: (a) obtaining a plurality of images from a longitudinal, time series, or multiparametric imaging; (b) applying spectral embedding (SE) to the longitudinal, time series, or multi-parametric imaging in a pixel-wise fashion to reduce a plurality of time point images to a single parametric embedding image (PrEIm), wherein the spectral embedding produces three smallest eigenvectors at each pixel location in the single parametric image by presenting color values in the parametric embedding image (PrEIm); (c) calculating spatial tensor-based gradients on the parametric embedding image (PrEIm) derived from spectral embedding (SE) eigenvectors; (d) selecting an initialization on the image; (e) evolving active contour (AC) on the parametric embedding image (PrEIm); and (f) detecting and segmenting the lesion based on morphological features derived from (e).

According to one embodiment of the method, the longitudinal, time series, or multi-parametric imaging is dynamic contrast enhanced magnetic resonance imaging (DCE-MRI). According to another embodiment, the longitudinal, time series, or multi-parametric imaging is T1 imaging. According to another embodiment, the longitudinal, time series, or multi-parametric imaging is T2 imaging. According to another embodiment, the longitudinal, time series, or multi-parametric imaging is diffusion-weighted imaging. According to another embodiment, at least one of steps (a), (b), (c), (d), (e) and (f) is performed using a computer. According to another embodiment, at least one of steps (a), (b), (c), (d), (e) and (f) is performed automatically. According to another embodiment, the lesion is a cancer. According to another embodiment, the cancer is a breast cancer. According to another embodiment, the cancer is a prostate cancer. According to another embodiment, the cancer is a brain cancer. According to another embodiment, the cancer is a liver cancer. According to another embodiment, the cancer is a kidney cancer. According to another embodiment, the lesion is a plaque in a blood vessel. According to another embodiment, the blood vessel is a carotid artery.

According to another aspect, the described invention provides a computing device comprising: a processor, and a storage medium for tangibly storing thereon program logic for execution by the processor, the program logic comprising: (a) logic executed by the processor for obtaining a plurality of images from a longitudinal, time series, or multiparametric imaging; (b) logic executed by the processor for applying spectral embedding (SE) to longitudinal, time series, or multi-parametric imaging in a pixel-wise fashion to reduce a plurality of time point images to a single parametric embedding image (PrEIm), wherein the spectral embedding produces three smallest eigenvectors at each pixel location in the single parametric image by presenting color values in the parametric embedding image (PrEIm); (c) logic executed by the processor for calculating spatial tensor-based gradients on the parametric embedding image (PrEIm) derived from spectral embedding (SE) eigenvectors; (d) logic executed by the processor for selecting an initialization on the image; (e) logic executed by the processor for evolving active contour (AC) on the parametric embedding image (PrEIm); and (f) logic executed by the processor for detecting and segmenting a lesion based on morphological features derived from (e).

According to one embodiment, the longitudinal, time series, or multi-parametric imaging is dynamic contrast enhanced magnetic resonance imaging (DCE-MRI). According to another embodiment, the longitudinal, time series, or multi-parametric imaging is T1 imaging. According to another embodiment, the longitudinal, time series, or multi-parametric imaging is T2 imaging. According to another embodiment, the longitudinal, time series, or multi-parametric imaging is diffusion-weighted imaging. According to another embodiment, the lesion is a cancer. According to another embodiment, the cancer is a breast cancer. According to another embodiment, the cancer is a prostate cancer. According to another embodiment, the cancer is a brain cancer. According to another embodiment, the cancer is a liver cancer. According to another embodiment, the ment, the lesion is a plaque in a blood vessel. According to another embodiment, the blood vessel is a carotid artery.

According to another aspect, the described invention provides a computer-readable storage medium tangibly storing thereon computer program instructions capable of being executed by a computer processor of a computing device, the computer program instructions defining steps of: (a) obtaining a plurality of images from a longitudinal, time series, or multiparametric imaging; (b) applying spectral embedding (SE) to longitudinal, time series, or multi-parametric imaging in a pixel-wise fashion to reduce a plurality of time point images to a single parametric embedding image (PrEIm), wherein the spectral embedding produces three smallest eigenvectors at each pixel location in the single parametric image by presenting color values in the parametric embedding image (PrEIm); (c) calculating spatial tensor-based gradients on the parametric embedding image (PrEIm) derived from spectral embedding (SE) eigenvectors; (d) selecting an initialization on the image; (e) evolving active contour (AC) on the parametric embedding image (PrEIm); and (f) detecting and segmenting a lesion based on morphological features derived from (e).

According to one embodiment, the longitudinal, time series, or multi-parametric imaging is dynamic contrast enhanced magnetic resonance imaging (DCE-MRI). According to another embodiment, the longitudinal, time series, or multi-parametric imaging is T1 imaging. According to another embodiment, the longitudinal, time series, or multi-parametric imaging is T2 imaging. According to another embodiment, the longitudinal, time series, or multi-parametric imaging is diffusion-weighted imaging. According to another embodiment, the lesion is a cancer. According to another embodiment, the cancer is a breast cancer. According to another embodiment, the cancer is a prostate cancer. According to another embodiment, the cancer is a brain cancer. According to another embodiment, the cancer is a liver cancer. According to another embodiment, the cancer is a kidney cancer. According to another embodiment, the lesion is a plaque in a blood vessel. According to another embodiment, the blood vessel is a carotid artery.

According to another aspect, the described invention provides a method for registering time series data by utilizing reduced-dimension eigenvectors derived from spectral embedding (SE) of a feature scene, the method comprising: (a) obtaining a plurality of images from a longitudinal, time series, or multiparametric imaging; (b) applying spectral embedding (SE) to time series data to transform a plurality of time series images into an alternative data presentation, wherein the spectral embedding (SE) places a pre-contrast image and a post-contrast image in a same embedding space and allows embedding eigenvectors to separate salient regions from non-salient regions in the image and to identify corresponding regions in the both pre-contrast and post-contrast images; (c) driving registration based on areas of the salient regions and the corresponding regions; and (d) capturing statistics of multi-dimensional data found in multiple spectral embedding (SE) eigenvectors.

According to one embodiment, capturing in (d) is performed using alpha-mutual information (α-MI).

According to another aspect, the described invention provides a computing device comprising: a processor; and a storage medium for tangibly storing thereon program logic for execution by the processor, the program logic comprising: (a) logic executed by the processor for obtaining a plurality of images from a longitudinal, time series, or multiparametric imaging; (b) logic executed by the processor for applying spectral embedding (SE) to a plurality of time series data to transform time series images into an alternative data presentation, wherein the spectral embedding (SE) places a pre-contrast image and a post-contrast image in a same embedding space and allows embedding eigenvectors to separate salient regions from non-salient regions in the image and to identify corresponding regions in the both pre-contrast and post-contrast images; (c) logic executed by the processor for driving registration based on areas of the salient regions and the corresponding regions; and (d) logic executed by the processor for capturing statistics of multi-dimensional data found in multiple spectral embedding (SE) eigenvectors.

According to one embodiment, capturing in (d) is performed using alpha-mutual information ($\alpha$-MI).

According to another aspect, the described invention provides a computer-readable storage medium tangibly storing thereon computer program instructions capable of being executed by a computer processor of a computing device, the computer program instructions defining steps of: (a) obtaining a plurality of images from a longitudinal, time series, or multiparametric imaging; (b) applying spectral embedding (SE) to time series data to transform time series images into an alternative data presentation, wherein the spectral embedding (SE) places a pre-contrast image and a post-contrast image in a same embedding space and allows embedding eigenvectors to separate salient regions from non-salient regions in the image and to identify corresponding regions in the both pre-contrast and post-contrast images; (c) driving registration based on areas of the salient regions and the corresponding regions; and (d) capturing statistics of multi-dimensional data found in multiple spectral embedding eigenvectors.

According to one embodiment, capturing in (d) is performed using alpha-mutual information ($\alpha$-MI).

DETAILED DESCRIPTION OF THE INVENTION

Glossary

Figure 1:
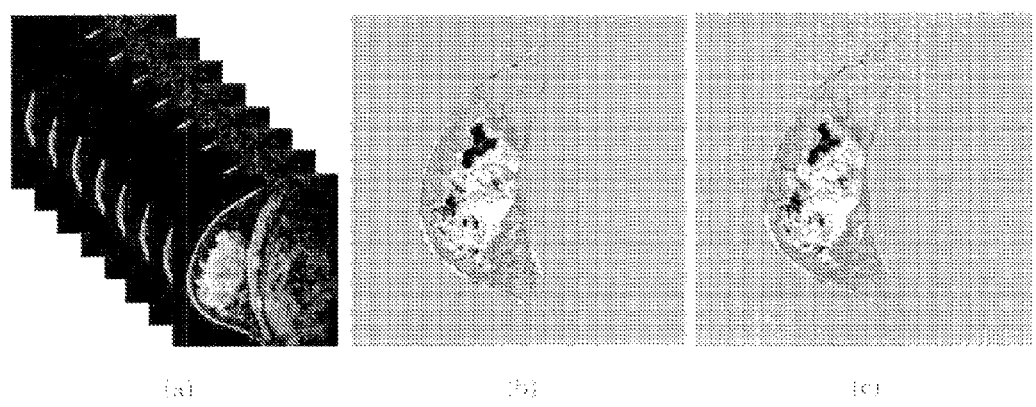
FIG. 1 shows workflow of spectral embedding-based active contour (SEAC). (a) Each time point image for a given magnetic resonance imaging slice is collated, and every pixel location is characterized by a T-dimensional signal intensity vector, where T represents the total number of time points at which the MRI is acquired during the course of the administration of the contrast agent. (b) Spectral embedding is performed in a pixel-wise fashion to preserve global and local similarities in time-intensity curves at each pixel, where pixels having similar colors signifies having similar time-intensity curves. (c) A hybrid active contour (AC) segmentation is performed to generate a final lesion segmentation.
Figure 2:
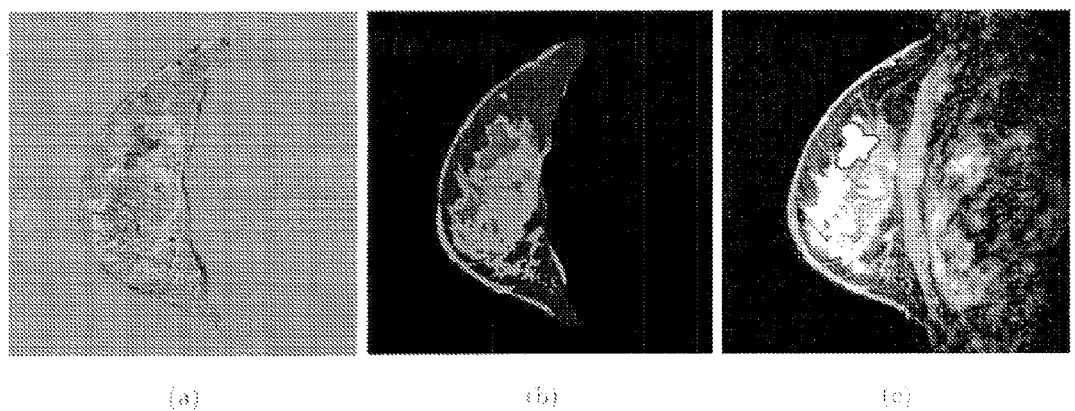
FIG. 2 shows that image gradients derived from conventional methods (principle component analysis (PCA), fuzzy c-means (FCM), or ground truth manual segmentation by radiologist) are not strong enough to serve as the stopping criterion for an active contour (AC) formulation.

The term "active contour" or "AC" as used herein refers to a model for evolving contours by iteratively minimizing an energy term associated with a contour. In many cases, the energy is calculated as a sum of internal and external energies.

The term "eigenvector" as used herein refers to a special set of vectors associated with a linear system of equations (i.e., a matrix equation) that are sometimes also known as characteristic vectors, proper vectors, or latent vectors. Each eigenvector is paired with a corresponding so-called "eigenvalue."

The term "evolving active contour (AC)" as used herein refers to applying a "hybrid active contour (AC)", which deviates from conventional boundary-based or region-based active contour models by combining both boundary and region information from the image, allowing the two types of image information to simultaneously drive the AC model to optimize the curve such that (1) the difference between region statistics inside the AC and outside the AC is maximized; and (2) gradient magnitude is maximized at the border between foreground and background areas of the image scenes.

The term "image" as used herein refers to any time dependent imaging data, including, but not limited to Computed Tomography (CT) with contrast of any anatomy, Dynamic Contrast Enhanced Magnetic Resonance Imaging (DCE-MRI) of any anatomy, time-dependent ultrasound, cellular imaging during exposure to a reagent or culture medium, cancer imaging in a radiologic domain, including, but not limited to, breast, prostate, brain, liver, kidney, and plaque visualization in cardiac imaging.

The term "initialization" as used herein refers to manually selecting a point within the object of interest (OOI) for an active contour (AC) model.

The term "longitudinal imaging" as used herein refers to any time-dependent imaging data.

The term "normalized mutual information" or "NMI" as used herein refers to a measure of the dependence between random variables.

The term "parametric embedding" as used herein refers to a method for embedding objects with a class structure into a low-dimensional visualization space.

The term "parametric imaging" as used herein refers to a diagnostic procedure in which an image of a physiologic parameter (e.g., blood flow) or an administered radioactive tracer is derived mathematically, such as by dividing one image by another according to anatomic position.

The term "multiparametric" as used herein refers to images derived through various acquisition techniques such as, but not limited to, MRI, positron emission tomography (PET), single-photon emission computed tomography (SPECT), ultrasound, x-ray, CT or histopathology. Another example would be distinct image acquisitions within MRI such as diffusion-weighted imaging, T1-weighted imaging or T2-weighted imaging.

The term "registering" as used herein refers to spatially aligning two distinct images so that anatomy of interest occupies the same pixels in both images.

The term "spatial tensor-based gradient" as used herein refers to calculating the spatial gradient of a vector-valued image, resulting in a tensor-valued gradient.

The term "spectral embedding" or "SE" as used herein, refers to a graph-based manifold learning method used for high dimensional data classification. SE is used to cluster image pixels based on their similarity to provide an alternative data representation to a multidimensional image.

I. Spectral Embedding-Based Active Contour (SEAC) for Lesion Segmentation

According to one aspect, the described invention provides a method for detecting and segmenting a lesion from longitudinal, time series, or multi-parametric imaging by utilizing spectral embedding-based active contour (SEAC), the method comprising:

(a) obtaining a plurality of images from a longitudinal, time series, or multiparametric imaging;

(b) applying spectral embedding (SE) to the longitudinal, time series, or multi-parametric imaging in a pixel-wise fashion to reduce a plurality of time point images to a single parametric embedding image (PrEIm), wherein the spectral embedding produces three smallest eigenvectors at each pixel location in the single parametric image by presenting color values in the parametric embedding image (PrEIm);

(c) calculating spatial tensor-based gradients on the parametric embedding image (PrEIm) derived from spectral embedding (SE) eigenvectors;

(d) selecting an initialization on the image;

(e) evolving active contour (AC) on the parametric embedding image (PrEIm); and (f) diagnosing the lesion based on morphological features derived from (e).

According to one embodiment of the method, the longitudinal, time series, or multi-parametric imaging is dynamic contrast enhanced magnetic resonance imaging (DCE-MRI).

According to another embodiment, the longitudinal, time series, or multi-parametric imaging is T1 imaging. According to another embodiment, the longitudinal, time series, or multi-parametric imaging is T2 imaging. According to another embodiment, the longitudinal, time series, or multi-parametric imaging is diffusion-weighted imaging.

According to one embodiment, at least one of steps (a), (b), (c), (d), (e) and (f) is performed using a computer.

According to another embodiment, at least one of steps (a), (b), (c), (d), (e) and (f) is performed automatically.

According to another embodiment, the lesion is a cancer. According to another embodiment, the cancer is a breast cancer. According to another embodiment, the cancer is a prostate cancer. According to another embodiment, the cancer is a brain cancer. According to another embodiment, the cancer is a liver cancer. According to another embodiment, the cancer is a kidney cancer.

According to another embodiment, the lesion is a plaque in a blood vessel. According to another embodiment, the blood vessel is a carotid artery.

According to another embodiment, the method can be applied to any time-dependent imaging data, including, but not limited to, computed tomography (CT) with contrast of any anatomy, dynamic contrast-enhanced magnetic resonance imaging (DCE-MRI) of any anatomy, time-dependent ultrasound, and cellular imaging during exposure to a reagent or culture medium.

According to one embodiment, spectral embedding (SE) can be applied to any multi-dimensional, longitudinal or time-series data whereby the multi-attribute data is reduced to a single parametric image representation. Each voxel (volumetric pixel) in this reduced dimensional, parametric image representation is characterized by the set of orthonormal eigenvectors that aim to preserve both local and global similarities (Shi, J. and Malik, J., IEEE PAMI, 22(8):888-905, 2000). According to some such embodiments, a SE approach yield improved region-based statistics, which in conjunction with stronger boundary gradients results in an improved hybrid active contour (AC) scheme.

According to another embodiments, spectral embedding-based active contour (SEAC) provides strong gradients at the margin of an object of interest (OOI).

According to another embodiment, the use of spectral embedding-based active contour (SEAC) of the described invention is not limited to dynamic contrast enhanced magnetic resonance imaging (DCE-MRI) data alone and can be used for lesion detection and segmentation on other types of longitudinal or time series data as well as other types of multi-parametric imaging (e.g., T1-, T2-, and diffusion-weighted imaging).

According to another aspect, the described invention provides a computing device comprising:

a processor;

a storage medium for tangibly storing thereon program logic for execution by the processor, the program logic comprising:

(a) logic executed by the processor for obtaining a plurality of images from a longitudinal, time series, or multi-parametric imaging;

(b) logic executed by the processor for applying spectral embedding (SE) to longitudinal, time series, or multi-parametric imaging in a pixel-wise fashion to reduce a plurality of time point images to a single parametric embedding image (PrEIm), wherein the spectral embedding produces three smallest eigenvectors at each pixel location in the single parametric image by presenting color values in the parametric embedding image (PrEIm);

(c) logic executed by the processor for calculating spatial tensor-based gradients on the parametric embedding image (PrEIm) derived from spectral embedding (SE) eigenvectors;

(d) logic executed by the processor for selecting an initialization on the image;

(e) logic executed by the processor for evolving active contour (AC) on the parametric embedding image (PrEIm); and (f) logic executed by the processor for diagnosing the lesion based on morphological features derived from (e).

According to one embodiment, the longitudinal, time series, or multi-parametric imaging is dynamic contrast enhanced magnetic resonance imaging (DCE-MRI).

According to another embodiment, the longitudinal, time series, or multi-parametric imaging is T1 imaging. According to another embodiment, the longitudinal, time series, or multi-parametric imaging is T2 imaging. According to another embodiment, the longitudinal, time series, or multi-parametric imaging is diffusion-weighted imaging.

According to one embodiment, the lesion is a cancer. According to another embodiment, the cancer is a breast cancer. According to another embodiment, the cancer is a prostate cancer. According to another embodiment, the cancer is a brain cancer. According to another embodiment, the cancer is a liver cancer. According to another embodiment, the cancer is a kidney cancer.

According to another embodiment, the lesion is a plaque in a blood vessel. According to another embodiment, the blood vessel is a carotid artery.

According to another embodiment, the method can be applied to any time-dependent imaging data, including, but not limited to, computed tomography (CT) with contrast of any anatomy, dynamic contrast-enhanced magnetic resonance imaging (DCE-MRI) of any anatomy, time-dependent ultrasound, and cellular imaging during exposure to a reagent or culture medium.

According to another embodiment, spectral embedding (SE) can be applied to any multi-dimensional, longitudinal or time-series data, whereby the multi-attribute data is reduced to a single parametric image representation. Each voxel (volumetric pixel) in this reduced dimensional, parametric image representation is characterized by the set of orthonormal eigenvectors that aim to preserve both local and global similarities (Shi, J. and Malik, J., IEEE PAMI, 22(8):888-905, 2000). According to some such embodiments, a SE approach yield improved region-based statistics, which in conjunction with stronger boundary gradients results in an improved hybrid active contour (AC) scheme.

According to another embodiments, spectral embedding-based active contour (SEAC) provides strong gradients at the margin of an object of interest (OOI).

According to another aspect, the described invention provides a computer-readable storage medium tangibly storing thereon computer program instructions capable of being executed by a computer processor of a computing device, the computer program instructions defining steps of:

(a) obtaining a plurality of images from a longitudinal, time series, or multiparametric imaging;

(b) applying spectral embedding (SE) to longitudinal, time series, or multi-parametric imaging in a pixel-wise fashion to reduce a plurality of time point images to a single parametric embedding image (PrEIm), wherein the spectral embedding produces three smallest eigenvectors at each pixel location in the single parametric image by presenting color values in the parametric embedding image (PrEIm);

(c) calculating spatial tensor-based gradients on the parametric embedding image (PrEIm) derived from spectral embedding (SE) eigenvectors;

(d) selecting an initialization on the image;

(e) evolving active contour (AC) on the parametric embedding image (PrEIm); and (f) diagnosing the lesion based on morphological features derived from (e).

According to one embodiment, the longitudinal, time series, or multi-parametric imaging is dynamic contrast enhanced magnetic resonance imaging (DCE-MRI).

According to another embodiment, the longitudinal, time series, or multi-parametric imaging is T1 imaging. According to another embodiment, the longitudinal, time series, or multi-parametric imaging is T2 imaging. According to another embodiment, the longitudinal, time series, or multi-parametric imaging is diffusion-weighted imaging.

According to one embodiment, the lesion is a cancer. According to another embodiment, the cancer is a breast cancer. According to another embodiment, the cancer is a prostate cancer. According to another embodiment, the cancer is a brain cancer. According to another embodiment, the cancer is a liver cancer. According to another embodiment, the cancer is a kidney cancer.

According to another embodiment, the lesion is a plaque in a blood vessel. According to another embodiment, the blood vessel is a carotid artery.

According to another embodiment, spectral embedding (SE) can be applied to any multi-dimensional, longitudinal or time-series data, whereby the multi-attribute data is reduced to a single parametric image representation.

According to another embodiments, spectral embedding-based active contour (SEAC) provides strong gradients at the margin of an object of interest (OOI).

1. Spectral Embedding-Based Active Contour (SEAC)

Step 1. Apply SE to the Dynamic Contrast-Enhanced Magnetic Resonance Imaging (DCE-MRI)

Let $F=[F(c)]^T \epsilon R^{N \times T}, \forall c \epsilon C$ be the data matrix of $N=|C|$ (where $|\cdot|$ is the cardinality of a set) feature vectors with dimensionality T. F(c) represents the features assigned to a given pixel, c. In this case, F(c) contains the assigned signal intensity values at every pixel c at each time point $t \epsilon \{0, 1, 2, \ldots, T-1\}$ where T is the number of time points the DCE-MRI time series. t=0 refers to the time at which the pre-contrast image is acquired and $t \epsilon \{1, \ldots, T-1\}$ refers to the times at which the subsequent post-contrast images are acquired. The aim of spectral embedding (SE) is to reduce $F \epsilon R^{N \times T}$ to a low d-dimensional space where $d \ll T$. The three smallest eigenvectors at each pixel location in the image, which result from the spectral embedding are used represent the color values in the parametric embedding image (PrEIm) (see FIG. 1 (b)).

TABLE I

Description of Notation

| Symbol | Description |
|---|---|
| C | 2D Cartesian grid of pixels c = (x, y) |
| F(c) | Signal intensity vector of c |
| v(c) | Eigenvectors associated with pixel c |
| f | Single feature vector |
| C | The zero level set C = {c ∈ θ : ϕ (c) = 0} |
| H(ϕ) | Heaviside function $H(\phi) = \begin{cases} 1, & \phi(c) \geq 0; \\ 0, & \phi(c) < 0. \end{cases}$ |
| $\Omega_h$, h ∈ {1, 2} | Region membership $\Omega_h = \begin{cases} \Omega_1, & \phi(c) \geq 0. \\ \Omega_2, & \phi(c) < 0. \end{cases}$ |
| C | 2D image scene |
| F | Set of all time intensity vectors $[F(c)]^T$, $\forall$ c ∈ C |
| p(v(c)) | Local structure tensor of v(c) |

TABLE I-continued

Description of Notation

| Symbol | Description |
|---|---|
| V | Eigenscene associated with C |
| γ(v(c)) | Tensor gradient computed on v |
| δ(ϕ) | Delta Function $\delta(\phi) = \begin{cases} +\infty, & \phi(c) = 0; \\ 0, & \phi(c) \neq 0. \end{cases}$ |
| ϕ(t; c) | The level set function |

Step 2. Calculate Spatial Gradients on the Parametric Embedding Image (PrEIm):

The spatial (X- and Y directional) tensor-based gradients are derived from the SE eigenvectors, which are fed into the energy functional of a hybrid active contour (AC) model. The described invention leverages the findings in Xu et al. (Medical image analysis. 1 Dec. 2011, volume 15 issue 6 Pages 851-862), which provides that the tensor gradient derived from the vectorial image provides stronger gradients for driving the active contour (AC) model than the corresponding gradient derived from a scalar image.

Step 3. Select an Initialization on the Image:

A point within the object of interest (OOI) is selected manually, which serves as the initialization for the AC model.

Step 4. Evolve Active Contour (AC) on Parametric Embedding Image (PrEIm):

The hybrid AC deviates from traditional boundary- or region-based AC models by combining both boundary and region information from the image, allowing the two types of image information to simultaneously drive the AC model to optimize the curve such that: (1) the difference between region statistics inside the active contour (AC) the and outside the active contour (AC) is maximized; and (2) gradient magnitude is maximized at the border between foreground and background areas of the image scene. Moreover, the described invention employs a selective, intelligent weighting of the region and boundary terms of the hybrid active contour (AC). This is done by selecting a range of values (detailed in Table II) for both the region and boundary terms and selecting the combination that provides the best approximation to the ground truth segmentation based on both boundary and area based metrics.

2. Gradient Tensors in a Spectrally Embedded Space 2.1. Theory of Spectral Embedding Let v(c) be the function that defines the eigenvectors associated with c, $\forall c \epsilon C$ and let v be the eigenspace defined by v(c). For simplicity of notation in the spectral embedding formulation, f is defined as s single vector in F, dissociated from its spatial pixel location in the image and $\hat{V}=[v(c) \forall c \epsilon C]^T \epsilon R^{N \times T}$ as the vectorized form of v(c). The optimal $\hat{v}$ is obtained by solving the generalized eigenvalue decomposition problem, $$(D-W)\hat{v}=\hat{v}\Lambda_d D, \quad \text{Equation [1]}$$

where $\Lambda_d$ is the matrix corresponding to the eigenvalues of associated with the smallest d eigenvectors. W is the weighted adjacency matrix that characterizes the similarity between pair wise observations, I and j. The graph edge weight of two nodes, i and j, can be formulated by Gaussian similarity function $$w(i, j) = \exp\frac{-\|f(i) - f(j)\|_2^2}{\sigma_c^2}$$

where $\sigma_c$ is a scaling parameter. D is the degree matrix such that the degree of a vertex is defined as $di=\Sigma_j w(i,j), i,j \in \{1, \ldots, N\}$ The graph theoretic derivation of the eigenvalue problem found in Equation 1 can be found in (Shi, J, and Malik, J, IEEE PAMI, 22(8):888-905, 2000; von Luxburg, U., A tutorial on spectral clustering. Technical report, Max Planck Institute for Biological Cybernetics, 2006; the entire content of each reference is incorporated herein by reference).

The resulting d eigenvectors corresponding to d smallest eigenvalues can be used to construct parametric embedding image (PrEIm) representations of the DCE-MRI data such as those seen in FIG. 1. FIG. 1 shows the alternative image representation derived from the three smallest eigenvalues. Objects that are adjacent to each other in the embedding space will consequently have a similar color (FIG. 1 (b)).

2.2. Computing Spatial Gradients in Spectrally Embedded Space

Following the calculation of the eigenvectors by solving the minimization of Equation (1), the gradients of the embedding vectors can be subsequently calculated along the spatial coordinates axes, which results in a tensor gradient function, $\nabla V$.

$\nabla V$ is inspired by the Cumani operator (Aldo, C. Edge detection in multispectral images. pages 40-51. Academic Press, Inc., 1991), a second-order differential operator for vectorial images, based on the Di Zenzo multi-valued geometry (Di Zenzo, S., A note on the gradient of a multi-image. volume 33, pages 116-125, Academic Press Professional, Inc., San Diego, Calif., USA, 1986). Thus, $\nabla V$ defines a tensor gradient over the eigenvector space and the gradient is calculated via the local structure tensor. For an eigen image $V=v(C)$, where $v(c)$ at each $c \in C$ can be written in matrix form as $$dv(c)^2 = \begin{bmatrix} dx \\ dy \end{bmatrix}^T \begin{bmatrix} \rho_{11} & \rho_{12} \\ \rho_{21} & \rho_{22} \end{bmatrix} \begin{bmatrix} dx \\ dy \end{bmatrix} \quad \text{Equation [2]}$$

where $$\rho_{11} = \left(\frac{\partial v(c)}{\partial x}\right)^T \left(\frac{\partial v(c)}{\partial x}\right) = \left(\frac{\partial v_1(c)}{\partial x}\right)^2 + \left(\frac{\partial v_2(c)}{\partial x}\right)^2 + \left(\frac{\partial v_3(c)}{\partial x}\right)^2,$$

$$\rho_{12} = \rho_{21} = \left(\frac{\partial v(c)}{\partial x}\right)^T \left(\frac{\partial v(c)}{\partial y}\right) = \left(\frac{\partial v_1(c)}{\partial x}\right) \cdot \left(\frac{\partial v_1(c)}{\partial y}\right) +$$

$$\left(\frac{\partial v_2(c)}{\partial x}\right) \cdot \left(\frac{\partial v_2(c)}{\partial y}\right) + \left(\frac{\partial v_3(c)}{\partial x}\right) \cdot \left(\frac{\partial v_3(c)}{\partial y}\right)$$

Equation [3]

$\rho_{22}$ is defined similarly to $\rho_{11}$ along the y-axis. It is important to note that the gradients, $\rho_{11}$, $\rho_{12}$, $\rho_{22}$ are computed on the eigenvectors in the embedding space. The matrix $$\rho(v(c)) = \begin{bmatrix} \rho_{11} & \rho_{12} \\ \rho_{21} & \rho_{22} \end{bmatrix}$$

is the first fundamental form in vector eigenspace and is also referred to as the local structure tensor. For the matrix $[\rho(v(c))]$, the maximum and minimum eigenvalues of the matrix ($\tilde{\lambda}_+$ and $\tilde{\lambda}_-$) representing the extreme rates of change in the direction of their corresponding eigenvectors. ($\tilde{\lambda}_+$ and $\tilde{\lambda}_-$) may be formally expressed by $\tilde{\lambda}_\pm = (\rho_{11}+\rho_{22} \pm \sqrt{\Delta})/2$, where $\Delta=(\rho_{11}-\rho_{22})^2+4\rho_{12}^2$. The tensor gradient is defined as, $$\gamma(v(c)) = \sqrt{\tilde{\lambda}_+ - \tilde{\lambda}_-}, \quad \text{Equation [4]}$$

Figure 3:
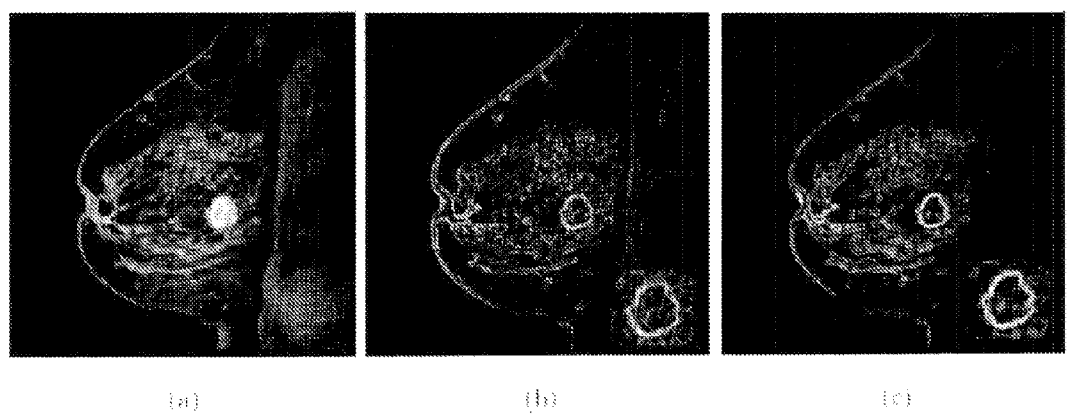
FIG. 3 shows an example of the improved gradient information found in the tensor gradient derived from SE compared to the grayscale image. (a) Original grayscale MR image of a malignant breast lesion at peak contrast enhancement along with the (b) grayscale gradient derived from grayscale image and the (c) tensor gradient derived from spectral embedding parametric image. Note that the edges of the lesion in (c) are much sharper than those shown in (b), which leads to steeper gradients at the lesion border.

$\forall c \in C$. Thus, $\nabla V \approx \gamma(v(C))$ when the tensor gradient is calculated over the entire image scene, C. From Equations (2)-(4), it is also easy to show that for pixel c the gray scale gradient $$\sqrt{\frac{\partial^2 v_j}{\partial x^2} + \frac{\partial^2 v_j}{\partial y^2}}$$

wherein j=1, (widely employed for edge detection) is a special case of the tensor gradient $\gamma(\cdot)$. In contrast, the tensor gradient of the embedding vectors in xy plane ($v_1, v_2, v_3$) are computed as $$\sqrt{\frac{\partial^2 v_j}{\partial x^2} + \frac{\partial^2 v_j}{\partial y^2}}$$

where $j \in \{1, 2, 3\}$. An example of the improved gradient information found in the tensor gradient derived from SE compared to the grayscale intensity image can be found in FIG. 3.

3. Spectral Embedding-Based Active Contour 3.1. Active Contour Model and its Energy Functional It is assumed that the image plane $\Omega \in \mathbb{R}^2$ is partitioned into two regions by a curve $\Upsilon$. The foreground region, or region of interest, is defined as $\Omega_1$, and the background region (i.e., the remainder of the image) is defined as $\Omega_2$ (see Table I). The relationship among and its constituents are as follows:

$$\Omega = \Omega_1 \cup \Omega_2 \cup \Upsilon \quad \text{Equation [5]}$$

where $\Omega_1$ and $\Omega_1$ are non-overlapping. In other words, $$\Omega_1 \cap \Omega_2 = \emptyset. \quad \text{Equation [6]}$$

3.2. Edge Based Active Contour

Previous active contour methods have proposed various approaches to formulate the optimal partition of the image plane $\Omega$, which can be obtained by the minimization of an energy functional. An active contour deforms in order to approximate the border between region of interest and non-region of interest (Chan, T. et al., mage Processing, IEEE Transactions on, 10(2):266-277, 2001; Tony, F. et al., Journal of Visual Communication and Image Representation, 11(2):130-141, 2000; Cohen, L., CVGIP: Image Understanding, 53(2):211-218, 1991; Rousson, M., and Deriche, R., In Motion and Video Computing, 2002. Proceedings. Workshop on, pages 56-61, 2002; Xu, J. et al., Medical image analysis. 1 Dec. 2011, volume 15 issue 6 Pages 851-862). In the simplified case, the energy functional is formulated as the integral of an edge detector function:

$$E_1 = \alpha_1 \int_\Upsilon g(v(c))dc \quad \text{Equation [7]}$$

which will converge to the contour that represents the regions of steepest gradient in the image. Modifying the simple model, Cohen added a second term to the energy functional, which represents the balloon force, or the force that pushes the contour outward in search of the regions of steepest gradient, much like the contour of a balloon increases as it is inflated. The energy functional containing both edge-detector and balloon force terms appears as follows:

$$E_1 + E_2 = \alpha_1 \int_\Upsilon g(v(c))dc + \alpha_2 \int_{\Omega_1} g(v(c))dc \quad \text{Equation [8]}$$

where $$g(v(c)) = \frac{1}{1 + \gamma(v(c))} \quad \text{Equation [9]}$$

Note that in this case, the gradient function, (v(c)) is often calculated by the gray PGP-30E level gradient (Cohen, L., CVGIP: Image Understanding, 53(2):211-218, 1991). However, in the present invention, the gradient function was chosen to be a color gradient function (Xu, J. et al., Medical image analysis. 1 Dec. 2011, volume 15 issue 6 Pages 851-862).

In order to maintain stable curve evolution and eliminate the need for re-initialization of the curve at each iteration of the evolution of the curve (Li, C. et al., In Proceedings of the 2005 IEEE Computer Society Conference on Computer Vision and Pattern Recognition (CVPR '05), Vol. 1-Vol. 01, CVPR '05, pages 430-436, Washington, D.C., USA, 2005. IEEE Computer Society), a third term $$E_3 = \zeta \int_\Omega \tfrac{1}{2}(\lambda \nabla \phi \|) - 1)^2 dc. \quad \text{Equation [10]}$$

has been implemented.

The combined energy functional is defined as $$E(\phi) = \alpha_1 E_1 + \alpha_2 E_2 + \gamma E_3 = \alpha_1 \int_\Upsilon g(v(c)) dc + \alpha_2 \int_{\Omega_1} g(v(c)) dc + \zeta \int_\Omega \tfrac{1}{2}(\|\nabla \phi\|) - 1) dc. \quad \text{Equation [11]}$$

3.3. Region-Based Active Contour

Region-based AC (RAC) models were proposed to address some of the limitations of edge based active contour models. The region-based model employs statistical information derived from different regions (foreground and background) to drive the AC model, which is independent of the edge detector function and does not require precise initialization (Fatakdawala, H. et al., Biomedical Engineering, IEEE Transactions on, 57(7):1676-1689, 2010).

One important RAC model is the Rousson-Deriche model (Rousson, M. and Deriche, R., In Motion and Video Computing, 2002. Proceedings. Workshop on, pages 56-61, December 2002), which assumes that the image plane comprises two regions and the intensities of pixels within each region satisfy a Gaussian distribution. The contour evolves as a result of competition between the log probability of current pixels c belonging to the foreground and background regions. The optimal image partition generated by maximizing the a posteriori partition probability, $P(\Omega|v(c))$. The assumptions are: (1) All partitions are equally possible. (2) Homogeneity of a region exists within a given boundary. (3) Pixels within a given region are independent. The generalized energy functional for the region-based term can then be described as follows (Rousson, M. and Deriche, R., In Motion and Video Computing, 2002. Proceedings. Workshop on, pages 56-61, December 2002):

$$E(\phi) = -\alpha \int_\Omega [H(\phi) \log p(v(c))|\theta_1) + (1-H(\phi)) \log p(v(c)|\theta_2)] dc + \beta \int_\Omega |\nabla H(\phi)| dc \quad \text{Equation [12]}$$

where $H(\phi)$ is the Heaviside function and $p(v(c)|\theta_h)(h \in \{1, 2\})$ is the multivariate Gaussian distribution function with parameter $\theta_h = \{\mu, \Sigma_h\}$, where $\mu_h$ and $\Sigma_h$ are the mean and covariance of the intensity in the region $h(h \in \{1, 2\}$ and are estimated by $$\mu_h = \frac{1}{|\Omega_h|} \int_{\Omega_h} v(c) dc, \quad \text{Equation [13]}$$

$$\Sigma_h = \frac{1}{|\Omega_h|} \int_{\Omega_h} (v(c) - \mu_h)(v(c) - \mu_h)^T dc$$

3.4. Hybrid Active Contour Energy Functional

Since RAC models do not typically include boundary information, a hybrid AC model can be employed to which combine the strengths of boundary-based (Cortes, C. and Vapnik, V., Machine Learning, 20(3):273-297, 1995) and region-based (Di Zenzo, S., A note on the gradient of a multi-image, 33, 116-125, Academic Press Professional, Inc., San Diego, Calif., USA, 1986) models by incorporating both gradient and region information into the AC model. The corresponding energy functional can be shown as $$E(\phi) = -\alpha \int_\Omega [H(\phi) \log p(v(c)|\theta_1) + (1 - H(\phi)) \log p(v(c)|\theta_2)] dc + \beta \int_\Omega g(v(c)) |\nabla H(\phi)| dc + \zeta \int_\Omega \tfrac{1}{2}(\|\nabla \phi\|) - 1)^2 dc. \quad \text{Equation [14]}$$

Using calculus of variations, the curve evolution function can be derived by minimizing the energy function (14):

Equation [15]

$$\begin{cases} \partial \phi(t; c) = \partial \delta(\phi)[\log p(v(c)|\theta_1) - \log p(v(c)|\theta_2)] + \\ \quad \beta \delta(\phi) div\left[g(v(c)) \frac{\nabla \phi}{|\nabla \phi|}\right] + \zeta\left[\Delta \phi - div\left(\frac{\nabla \phi}{\|\nabla \phi\|}\right)\right], \\ \phi(0, c) = \phi_0(c), \forall c \in \Upsilon \end{cases}$$

where $H(\phi)$ is the Heaviside function, $\Omega_1$ and $\Omega_2$ are the image foreground and background, respectively, $\phi(t;c)$ is the level set function, $\alpha$ and $\beta$ are positive constant parameters that can be used to variably weight the boundary- and region-based terms, $\zeta$ is the weight of the contour stabilization term (see Equation 10), and $\delta(\phi)$ is the Delta function. From an initial contour $\phi_0$, the curve evolution function in Equation (15) is evolved until model convergence. The iterative implementation of the curve evolution can be found in Algorithm V E.

4. Spectral Embedding-Based Active Contour (SEAC) Algorithm

Input: $\hat{C} = (C, \gamma)$
Output: Final AC: $\phi_T$
Begin
1: {Begin by computing tensor gradient of parametric embedding image (PrEIm) as described in Equations (2)-(4).}
2: Calculate $g(v(c)) = \dfrac{1}{1 + \gamma^2(v(c))}$;
3: $p(v(c)|\Theta_h)$, $h \in \{1, 2\}$ Model using multivariate Gaussians to approximate intensity distributions;
4: Formulate energy functional (Equation 5) using $p(v(c)|\Theta_h)$, $h \in \{1, 2\}$ and $g(v(c))$;
5: Initialize $\phi(t; c) = \phi_0$ where $t = 0$;
6: while $|\phi(t; c) - \phi(t - 1; c)| > \in d_0$
7: Minimize energy function, $\dfrac{\partial \phi}{\partial t}$;
8: $t = t + 1$
9: $\phi_T = \phi(t; c)$;

```
10:    end while
       end
```

II. Spectral Embedding (SE)-Based Registration Method

According to another aspect, the described invention provides a method for registering time series data by utilizing reduced-dimension eigenvectors derived from spectral embedding (SE) of a feature scene, the method comprising:

(a) obtaining a plurality of images from a longitudinal, time series, or multiparametric imaging;

(b) applying spectral embedding (SE) to time series data to transform time series images into an alternative data presentation, wherein the spectral embedding (SE) places a pre-contrast image and a post-contrast image in a same embedding space and allows embedding eigenvectors to separate salient regions from non-salient regions in the image and to identify corresponding regions in the both pre-contrast and post-contrast images;

(c) driving registration based on areas of the salient regions and the corresponding regions; and (d) capturing statistics of multi-dimensional data found in multiple spectral embedding eigenvectors.

According to one embodiment, capturing in (d) is performed using alpha-mutual information ($\alpha$-MI).

According to another aspect, the described invention provides a computing device comprising:

a processor;

a storage medium for tangibly storing thereon program logic for execution by the processor, the program logic comprising:

(a) logic executed by the processor for obtaining a plurality of images from a longitudinal, time series, or multiparametric imaging;

(b) logic executed by the processor for applying spectral embedding (SE) to time series data to transform time series images into an alternative data presentation, wherein the spectral embedding (SE) places a pre-contrast image and a post-contrast image in a same embedding space and allows embedding eigenvectors to separate salient regions from non-salient regions in the image and to identify corresponding regions in the both pre-contrast and post-contrast images;

(c) logic executed by the processor for driving registration based on areas of the salient regions and the corresponding regions; and (d) logic executed by the processor for capturing statistics of multi-dimensional data found in multiple spectral embedding eigenvectors.

According to one embodiment, capturing in (d) is performed using alpha-mutual information ($\alpha$-MI).

According to another aspect, the described invention provides a computer-readable storage medium tangibly storing thereon computer program instructions capable of being executed by a computer processor of a computing device, the computer program instructions defining steps of:

(a) obtaining a plurality of images from a longitudinal, time series, or multiparametric imaging;

(b) applying spectral embedding (SE) to time series data to transform time series images into an alternative data presentation, wherein the spectral embedding (SE) places a pre-contrast image and a post-contrast image in a same embedding space and allows embedding eigenvectors to separate salient regions from non-salient regions in the image and to identify corresponding regions in the both pre-contrast and post-contrast images;

(c) driving registration based on areas of the salient regions and the corresponding regions; and (d) capturing statistics of multi-dimensional data found in multiple spectral embedding eigenvectors.

According to another embodiment, capturing in (d) is performed using alpha-mutual information ($\alpha$-MI).

Spectral embedding (SE), a nonlinear dimensionality reduction (DR) method as described herein has the advantage over the linear DR method, such as principle component analysis (PCA), which was previously used by Staring et al. (IEEE Trans. Med. Imag. 28(9), 1412-1421, 2009) for time dependent data, of having the ability to capture the nonlinearities inherent in biological data, especially functional data such as DCE-MRI, where noise in the form of contrast agent is added in a nonlinear fashion to the image.

A linear DR method such as principle component analysis (PCA) would not be able to take such nonlinearities into account when embedding a pre-contrast image and a post-contrast image in the same space. In contrast, by embedding $C^{pre}$ and $C^{post}$ in the same embedding space, the SE approach allows the embedding eigenvectors to not only separate salient from non-salient regions in the image, but also to identify corresponding regions in both images.

The registration is driven then by these areas of correspondence and salience. In addition, instead of using the more commonly used histogram-based mutual information (MI) measure as the optimization function, $\alpha$-MI (Neeumuchwala, A. and Carson, P., mage matching using alpha-entropy measures and entropic graphs. Volume 85. 277-296, 2005, incorporated herein by reference in its entirety) is employed, which is a higher order entropy measure that can more accurately capture the statistics of multidimensional data such as that found in the multiple SE eigenvectors.

1. Theory and Motivation Behind SERg

Spectral Embedding

Let $\mathcal{F} = [F(x_1), F(x_2), \ldots, F(x_N) \in \mathbb{R}^{N \times D}]$ be the data matrix of N feature vectors with dimensionality D. The aim of SE is to reduce $\mathcal{F} \in \mathbb{R}^{N \times D}$ to a low d-dimensional space where d<<D. Let $V=[v_1, v_2, \ldots, v_N \in \mathbb{R}^{N \times D}]$ be the optimal low dimensional projections (Bradley, W. et al., American Journal of Neuroradiology, 8(6):1057-62, 1987) and the associated eigenvectors of a given object $x_i$, where $i \in \{1, \ldots, N\}$, are $v_i \in \mathbb{R}^{1 \times d}$ where $v_i = [v_1, v_2, \ldots, v_N]$ and $v_i \in \mathbb{R}^{1 \times 1}$, $i \in \{1, \ldots, d\}$ is an individual eigenvector for a given $v_i$. The optimal V can be obtained by solving, $$V = \underset{v}{\operatorname{argmin}} \left( \frac{\sum_r \sum_s \|v(r) - v(s)\|^2 w_{rs}}{\sum_r v(r)^2 d(r)} \right), \quad \text{Equation [16]}$$

where $w_{rs}$ is the (r, s) element of the weight matrix $W = [w_{rs}] \in \mathbb{R}^{N \times N}$, $r, s \in \{1, \ldots, N\}$, which assigns edge weights to characterize similarities between the pairwise observations $x_r$ and $x_s$ and $d(r) = \Sigma_s w_{rs}$, $r, s \in \{1, \ldots, N\}$ The graph edge weight of two nodes, r and s, can be formulated as $$w_{rs} = e^{\frac{-\|F(x_r) - F(x_s)\|_2^2}{\sigma_1^2}}$$

where $\sigma_1^2$ is a scaling parameter. The minimization of Equation (1) reduces to a minimum eigenvalue decomposition problem, $$(D-W)v = \lambda Dv \qquad \text{Equation [17]}$$

where D is a diagonal matrix, $D_n = \Sigma_s W_{rs}$. The three eigenvectors of $v_i = [v_1, v_2, v_3$ where $i \in \{1, \ldots, N\}$ associated with the smallest eigenvalues, $\lambda 1$, $\lambda 2$, $\lambda 3$, are used in conjunction with SERg.

2. Algorithm for SERg and its Use with α-Mutual Information

In the conventional manner, the registration method is formulated as an optimization problem such that a function (18), $$\hat{\mu} = \operatorname*{argmax}_{\mu} \phi(T_\mu(c); C^A, C^B), \qquad \text{Equation [18]}$$

describes the optimization, where $\phi$ is the objective function, measuring similarity between $C^A$ and $C^B$ which is maximized when $C^A$ and $C^B$ are aligned optimally, and $\hat{\mu}$ is the vector of coordinates that transforms the target image, $C^B$, to be in alignment with template image, $C^A$. In the case of 1-dimensional images such as intensity images, MI, $\phi_{MI}$ is used to optimize image alignment. MI is typically defined as $$\phi_{MI}(C^{pre}, C^{post}) = H(C^{pre}) + H(C^{post}) - H(C^{pre}, C^{post}) \qquad \text{Equation [19]}$$

where $H(C) = -\Sigma p_f \log p_f$ is the Shannon entropy of the intensities of image C, C, $H(C^{pre}, C^{post})$ is the joint entropy, and $p_f$ is the intensity probability at intensity f. However, in the case of multidimensional images, a multivariate approach must be taken to the objective function. This can be done through two methods: (1) histogram-based mutual information (MI), or (2) α-MI via entropic graphs (Neeunuchwala, H. et al., Image matching using alpha-entropy measures and entropic graphs. Volume 85. (2005) 277-296). The joint entropy is typically calculated using a joint histogram; however, issues of sparseness in the joint histogram can lead to inaccuracies in the computation of joint entropy. The use of entropic graphs was recently introduced by Neeumuchwala et al. (Image matching using alpha-entropy measures and entropic graphs. Volume 85. (2005) 277-296, incorporated herein by reference in its entirety) to overcome issues with using a joint histogram in the calculation of joint entropy, and in the described invention a-MI is used to estimate image similarity in a multivariate fashion. α-MI is calculated as, $$\alpha - MI = \frac{1}{\alpha - 1} \log \frac{1}{K^\alpha} \sum_{c=1}^{K} \left( \frac{\Gamma_c^{pre,post}(\mu)}{\sqrt{\Gamma_c^{pre} \Gamma_c^{post}(\mu)}} \right) 2\gamma \qquad \text{Equation [20]}$$

where $\Gamma^{pre,post}$ is neighborhood graph for all points in both the pre- and post-contrast images, $\Gamma^{pre}$ is the neighborhood graph for the pre-contrast, template image, $\Gamma^{post}$ is the neighborhood graph for the post-contrast, target image, $K=|c|$ where $|\cdot|$ is the cardinality of any set, $\gamma = D(1-\alpha)$ where D is the length of the feature vector describing c, and $0 < \alpha < 1$ ($\alpha = 0.99$ for all experiments herein as was previously done by Staring et al. (IEEE Trans. Med. Imag. 28(9), 1412-1421, 2009). Registration is performed using a free-form deformation previously described (Rueckert, D. et al., IEEE TMI, 18(8), 712-721, 1999).

3. Algorithm for SERg

---

Algorithm SERg

Input: Image scenes $C^{pre}, C^{post}$.
Output: Image transformation, $C^{post}(T_\mu(C))$.
Begin
0. Initialize $C^{pre}, C^{post}$;
1. Apply spectral embedding (Shi, J. and Malik, J., IPPE PAMI 22(8), 888-905, 2000, incorporated by reference herein in its entirety) to $\mathcal{F} = [F(x_1), F(x_2), \ldots, F(x_N) \in \mathbb{R}^{N \times D}]$ to obtain $V = [v_1, v_2, \ldots, v_N \in \mathbb{R}^{N \times D}]$;
2. Initialize $\psi(t) = \psi_0$ where $t = 0$;
3. while $|\psi(t) - \psi(T-1)| > \epsilon d_0|$
4.    Maximize $\psi(T_\mu(c)); \overline{C}^A, \overline{C}^B$
5.    $t = t + 1$
6. endwhile;
7. $C^{post}(T_\mu(C))$;
   end

---

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Unless defined otherwise, all technical and scientific terms used herein have the same meaning as commonly understood by one of ordinary skill in the art to which this invention belongs. Although any methods and materials similar or equivalent to those described herein also can be used in the practice or testing of the described invention, the preferred methods and materials are now described. All publications mentioned herein are incorporated herein by reference to disclose and describe the methods and/or materials in connection with which the publications are cited.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

It must be noted that as used herein and in the appended claims, the singular forms "a", "and", and "the" include plural references unless the context clearly dictates otherwise. All technical and scientific terms used herein have the same meaning.

The publications discussed herein are provided solely for their disclosure prior to the filing date of the present application. Nothing herein is to be construed as an admission that the described invention is not entitled to antedate such publication by virtue of prior invention. Further, the dates of publication provided may be different from the actual publication dates which may need to be independently confirmed.

The described invention may be embodied in other specific forms without departing from the spirit or essential attributes thereof and, accordingly, reference should be made to the appended claims, rather than to the foregoing specification, as indicating the scope of the invention.

Examples

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Experimental Design

A. Data Description

A total of 50 (30 malignant, 20 benign) breast DCE-MRI studies were obtained from the Hospital at the University of Pennsylvania. All of these were clinical cases where screening mammogram revealed a lesion suspicious for malignancy. All studies were collected under Institutional Review Board approval, and lesion diagnosis was confirmed by biopsy and histologic examination. Sagital T1-weighted, spoiled gradient echo sequences with fat suppression consisting of one series before contrast injection of Gd-DTPA (pre-contrast) and 3 to 8 series after contrast injection (post-contrast) were acquired at 1.5 Tesla (Siemens Magnetom). Single slice dimensions were 384×384 or 512×512 with a slice thickness of 3 cm. Temporal resolution between post-contrast acquisitions was a minimum of 90 seconds.

B. Application of Spectral Embedding-Based Active Contour (SEAC) to Breast DCE-MRI For each pixel, c, in each image, a dynamic signal intensity vector was created consisting of the signal intensity values of the pixel and each time point in the time series. $F(c)$ is the function that assigns a signal intensity value at every pixel c at each time point $t \in \{0, 1, 2, \ldots, T-1\}$ where T is the number of time points the DCE-MRI time series. $t=0$ refers to the time at which the pre-contrast image is acquired and $t \in \{1, 2, \ldots, T-1\}$ refer to the times at which the subsequent post-contrast images are acquired C. Implementation of Spectral Embedding-Based Active Contour (SEAC)

For each dataset, a seed point is selected in the region of interest based on visual inspection of the MR image. The same seed point is used across all alternative image representations.

Since the hybrid active contour incorporates region and boundary information, the individual constituent terms need to be differentially weighted based on the specific image domain to optimize the active contour. Thus, a brute force examination of these weights was carried out by first trying all combinations of weights on a subset of 10 of the datasets. The accuracy of the segmentation as described in the next section was used to determine the optimal parameters for a given image initialization. The range of parameters used with each AC model is described in Table II, and these ranges were based on the empirically derived optimal weights used previously (2). The stopping criterion for the AC is that which minimizes the energy function such that the difference in energy between a given iteration of the AC and the iteration preceding it is less than epsilon (see Algorithm V E for further details).

TABLE II

Summary of Experiments and Corresponding Parameters

| Method | Comparison Strategies (n = 50) | Parameters Used |
|---|---|---|
| Boundary | Peak CE, PCA FCM, PrEIm | $\alpha = 1, \beta = 0, \zeta = 1$ |
| Region | Peak CE, PCA FCM, PrEIm | $\alpha = 1, \beta = 0, \zeta = 1$ |
| Hybrid | FCM, PrEIm | $\alpha, \beta \in \{0.1, .2, 0.4, 0.8, 1.6, 3.2, 6.4, 12.8\}, \zeta = 1$ |
| SVM Classification | FCM, PrEIm | Radial basis function[11] |

D. Comparative Image Representation Strategies

Like SE, fuzzy c-means (FCM) and principle component analysis (PCA) are applied to the images on a per-pixel basis that allows for direct comparison of the methods to serve as an initialization to the active contour segmentation.

Fuzzy C-Means (FCM)

Fuzzy c-means (FCM) clustering as described in Chen et al. (9) is widely used for automated segmentation of breast lesions on DCE-MRI (4,28). FCM is a data clustering scheme similar to k-means in that data are clustered around a prescribed number of centroids. However, unlike k-means, the resulting class membership is a fuzzy membership to each cluster. In the described invention the method in Shi et al. (Medical Physics, 36(11):5052-5063, 2009) (referred to as FCM+AC) was implemented to compare the active contour (AC) driven by FCM to that driven by SE in spectral embedding-based active contour (SEAC), where FCM is applied to the time-intensity vectors, F.

Principal Component Analysis (PCA)

Principle component analysis (PCA) is a linear dimensionality reduction method which attempts to reduce the dimensionality of the data while retaining maximum variance of the dataset (Jolliffe, I., Principal component analysis. Springer series in statistics. Springer-Verlag, New York, 2nd ed. edition, 2002). PCA is most popularly implemented by performing an eigenvalue decomposition of a covariance matrix generated from the original data. The resulting eigenvectors are then considered to be the principle components, and the first few retain the maximum variance in the original dataset. In addition, if the eigenvectors are chosen to be orthonormal, then the variance captured by a given eigenvector is reflected by the corresponding eigenvalue. In the described invention, the input matrix to PCA is also F.

Applying the Hybrid Active Contour to the Comparative Strategies

After FCM and PCA are performed on all images, the hybrid active contour model is applied to both the 3-dimensional FCM parametric image result (referred to as FCM+AC) and the 3-dimensional PCA parametric image result (referred to as PCA+AC). In order to demonstrate the limitations of using the grayscale intensity images, spectral embedding-based active contour (SEAC) is compared to an AC driven by the peak contrast enhancement image automatically selected for each dataset.

Segmentation Performance Evaluation Measures

A. Ground Truth Generation

The region of interest (ROI) associated with the lesion was then manually segmented via MRIcro imaging software (Rorden, C. and Brett, M., Behav Neurol, 12(4):191-200, 2000) by an attending radiologist (M.A.R) with expertise in MR mammography who was naive to the lesion diagnosis. The radiologist selected a 2D slice of the MRI volume that was most representative of each lesion, and the analyses were performed only for that 2D slice. The ground truth segmentation is defined as the manual segmentation performed by the radiologist, and ground truth diagnosis was confirmed on histopathologic examination of lesion biopsy by a pathologist.

B. Boundary-Based Metrics

Mean absolute difference (MAD) is calculated by evaluating the mean difference between each point, $c_z$, on $G_1^a(\hat{C}) = \{c_z | z \in \{1, \ldots, Z\}\}$ (spectral embedding-based active contour (SEAC), PCA+AC or FCM+AC) where $Z = |G_1^a(\hat{C})|$ and $|\bullet|$ is the cardinality of any set, and the corresponding closest point, $c_\psi$, on the ground truth (GT) manual segmentation such that $G_1^b(C) = \{c_\psi | \psi \in \{1, \ldots, |G_1^b(C)|\}$ such that, $$MAD = \frac{1}{Z}\sum_{z=1}^{Z}\left[\min_\psi \|c_z - c_\psi\|2\right] \quad \text{Equation [21]}$$

Lower values of MAD reflect a more similar segmentation to the GT manual segmentation. Maximum Hausdorff distance ($HD_{max}$) is calculated as $$HD_{max} = \max_z\left[\min_\psi \|c_z - c_\psi\|2\right] \quad \text{Equation [22]}$$

C. Area-Based Matrices

Dice similarity coefficient (DSC) is calculated as follows:

$$DSC = \frac{2|G_2^a(\hat{C}) \cap G_2^b(C)|}{|G_2^a(\hat{C})| + |G_2^b(C)|} \quad \text{Equation [23]}$$

where $G_2^a(\hat{C})$ is the area enclosed by the automated segmentation and $G_2^a(C)$ is the area enclosed by the manual GT segmentation. The closer the DSC value is to 1, the more similar the automated lesion segmentation is to the GT segmentation.

D. Classifier-Based Metrics

Because an accurate lesion segmentation is necessary for accurate morphological feature extraction, improved classification accuracy would be the ultimate test to quantitatively demonstrate the superiority of SEAC over other state of the art breast lesion segmentation methods. Morphological features based on the lesion contour are extracted and used in conjunction with a support vector machine (SVM) classifier (a) to determine if morphological features based on SEAC contours can yield similar classifier accuracy to morphological features extracted from (a) manually segmented boundaries; and (b) to determine if morphological features based on SEAC segmentations will result in higher classifier accuracy compared to morphological features based on FCM+AC segmentations of breast lesions. In the present invention, 6 morphological features (Agner, S. et al., J. Digital Imaging, 24(3):446-463, 2011, incorporated by reference herein in its entirety) on 50 datasets (20 benign; 30 malignant) were calculated. The features extracted include those listed in Table III.

TABLE III

Morphological Features Extracted from
SEAC, FCM + AC and Manual Segmentation

| Area Overlap Ratio | Normalized Average Radial Distance Ratio |
|---|---|
| Standard Deviation of Normalized Distance Ratio | Variance of Distance Ratio |
| Compactness | Smoothness |

The morphological feature calculation requires a predefined lesion boundary, so the boundaries resulting from SEAC, FCM+AC and PCA+AC, and the manual segmentation were used for morphological feature extraction. The features for each lesion were then used in conjunction with a SVM classifier with leave-one-out cross validation to determine the lesion diagnosis. The method described in Agner et al., (J. Digital Imaging, 24(3):446-463, 2011) was used for converting the distance of an object from the hyperplane to a pseudo-likelihood which was used to generate a ROC curve for evaluating the different SVM classifiers.

E. Paired t-Test

Since FCM+AC is currently the most widely used method, statistical analysis is performed by calculating a paired t-test (Chen et al., Medical Physics, 33(8):2878-2887, 2006) between the metrics obtained using FCM+AC compared to both PCA+AC and SEAC. For the comparison of the AC models, the actual population means is used. For the classification experiment, a population mean of 0.5 is used since the AUC of each method is being compared to an AUC of 0.5 (Bhooshan, M. et al., Radiology, 254(3):680-690, 2010).

In the described invention, two different aspects of spectral embedding-based active contour (SEAC) were evaluated by comparing the alternative data representations obtained via peakCE, FCM, PCA and SE in terms of their ability to drive region-based, boundary-based AC segmentation schema. It was hypothesized that SE would provide better boundary and region statistics for driving an active contour segmentation scheme than peak CE, FCM or PCA. (Agner, S. et al., Spectral embedding-based active contour (SEAC): application to breast lesion segmentation on DCE-MRI., 7963, page 796305, SPIE, 2011). The FCM method was used, which is a commonly used lesion segmentation method for breast DCE-MRI, with SE in the ability of each to drive a hybrid AC model (Bhooshan, M. et al., Radiology, 254(3):680-690, 2010; Shi, J. et al., Medical Physics, 36(11):5052-5063, 2009).

Figure 4:
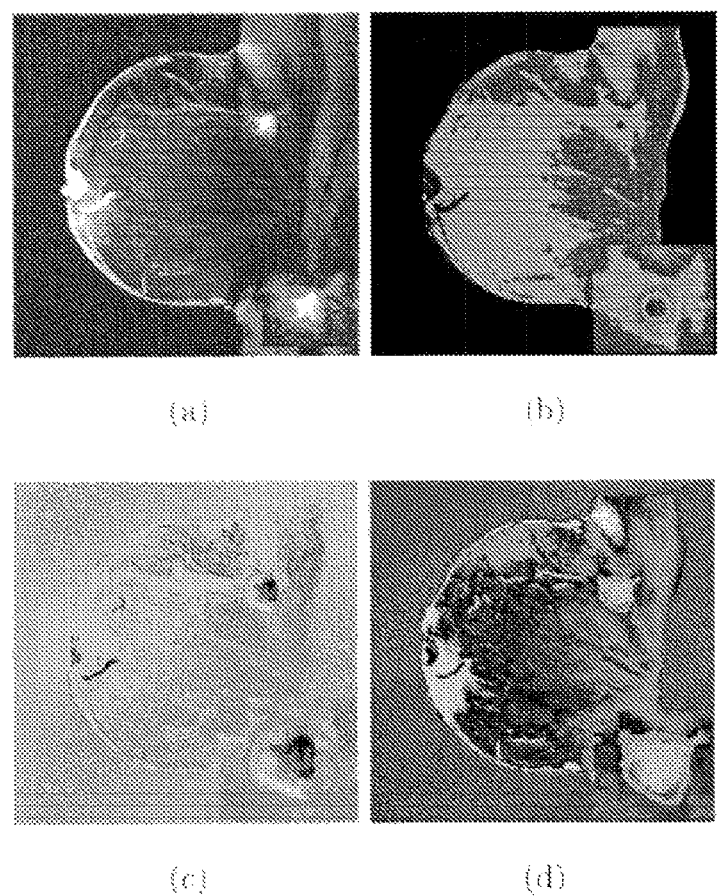
FIG. 4 shows an example of a boundary-based active contour (AC), which is driven by fuzzy c-means (FCM), principle component analysis (PCA), and spectral embedding-based active contour (SEAC). (a) ground truth segmentation and alternative image representations using (b) fuzzy c-means (FCM), (c) principle component analysis (PCA), and (d) spectral embedding-based active contour (SEAC). The SE image (d) provided better gradient information for driving a boundary-based active contour.
Figure 5:
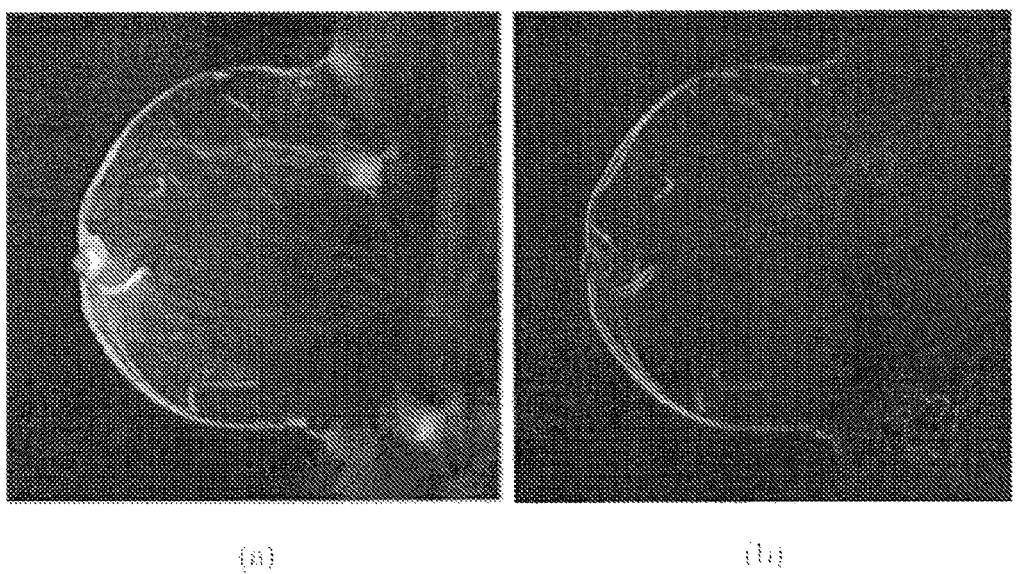
FIG. 5 shows the peakCE image for the example in FIG. 4 as well as the corresponding gradient image used by the active contour (AC) model. (a) Peak contrast enhancement image for a benign breast lesion, a lesion type that often does not take up contrast agent readily. (b) The gradient image corresponding to (a) illustrates why a boundary-based Active contour (AC) may be suboptimal in certain lesion cases.

Example 1. Comparison of Different Image Representation Schemes in Capturing Gradients FIG. 4 shows an example of a boundary-based AC driven by FCM, PCA and spectral embedding-based active contour (SEAC). In this example, it is clear that the SE image provides better gradient information for driving a boundary-based active contour. FIG. 5 shows the peakCE image for the example in FIG. 4 as well as the corresponding gradient image used by the AC model. For this dataset, the AC was unable to detect any strong boundaries using the peakCE image, and therefore the AC did not evolve. Table IV shows the boundary- and area-based measures using a boundary term alone for FCM+AC, PCA+AC, and spectral embedding-based active contour (SEAC). Smaller mean absolute difference (MAD) and Hausdorff distance (HD) correspond to increased similarity to the ground truth manual segmentation while greater Dice similarity coefficient signifies better correspondence to manual segmentation. The boundary-based AC performed best with spectral embedding-based active contour (SEAC).

TABLE IV

Evaluations of Image Representations in Conjunction
with a Boundary Based AC (n = 50)

| AC Method | MAD ($\mu \pm \sigma$) | DSC $\mu \pm \sigma$ | $HD_{max}\ \mu \pm \sigma$ |
|---|---|---|---|
| Peak CE + AC | 7.26 ± 12.02 | 0.56 ± 0.31 | 13.11 ± 14.11 |
| FCM + AC | 6.64 ± 6.37 | 0.50 ± 0.32 | 11.86 ± 10.14 |
| PCA + AC | 5.50 ± 4.23 | 0.52 ± 0.25 | 11.2 ± 7.50 |
| SEAC | 5.87 ± 5.94 | 0.57 ± 0.30 | 11.06 ± 9.90 |

Figure 6:
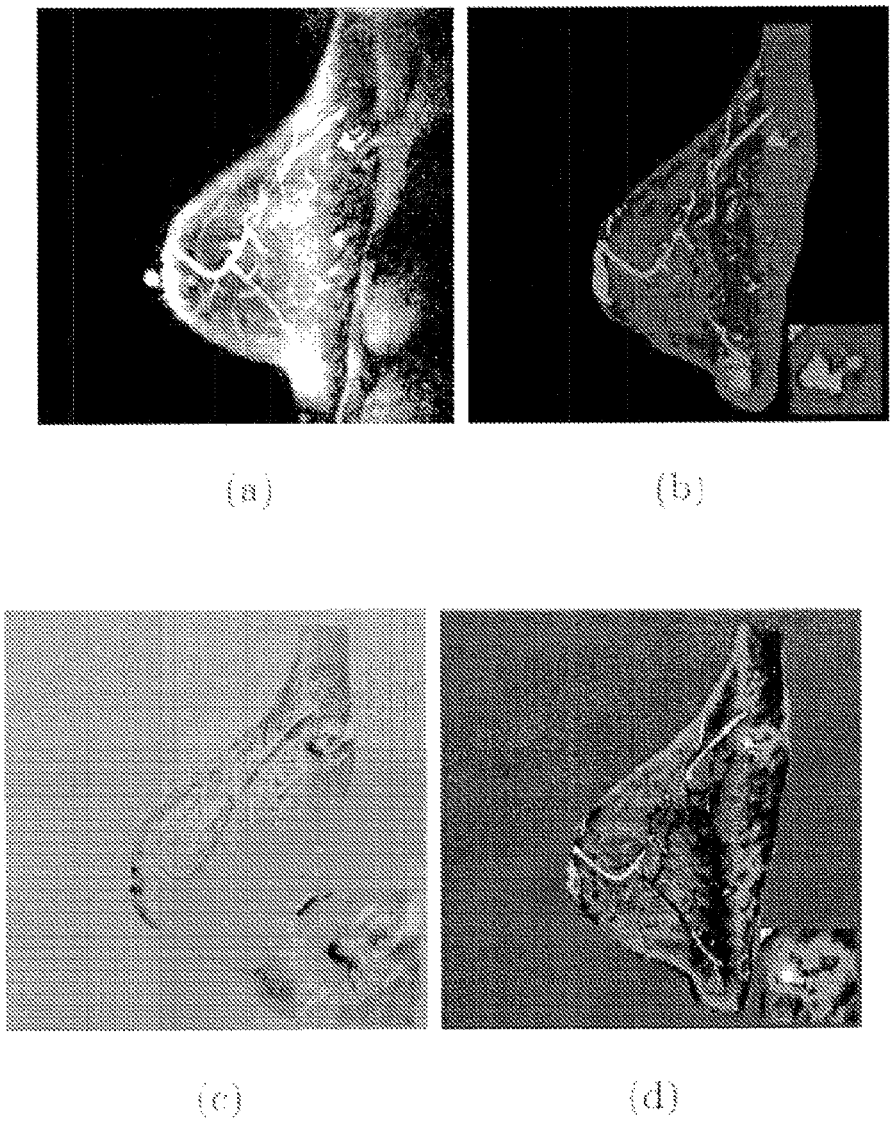
FIG. 6 shows a region-based active contour (AC) model driven by PeakCE, fuzzy c-means (FCM), principle component analysis (PCA), and SE. PeakCE and fuzzy c-means (FCM) performed poorly in conjunction with the region-based active contour (AC). (a) Ground truth segmentation and alternative image representations using (b) fuzzy c-means (FCM), (c) principle component analysis (PCA), and (d) spectral embedding-based active contour (SEAC). The inset at the bottom right of each figure (b-d) demonstrates the final segmentation using a region-based active contour (AC) model

Example 2. Comparison of Different Image Representation Schemes in Capturing Region Statistics FIG. 6 shows a region-based AC model driven by PeakCE, FCM, PCA and SE. PeakCE and FCM performed particularly poorly in conjunction with the region-based AC. The PeakCE and FCM initializations were unable to produce a stable curve evolution based solely on region statistics, and thus, no results are reported for PeakCE+AC or FCM+AC in Table V.

Table V shows the performance of region-based ACs. Again, spectral embedding-based active contour (SEAC) provided the segmentations that were most similar to ground truth in terms of MAD, DSC, and $HD_{max}$. Considering the fact that dimensionality reduction methods are meant to preserve global patterns in the data, it is not surprising that the region term is able to capitalize on this strength of both the linear and nonlinear dimensionality reduction methods used in the described invention.

TABLE V

Evaluations of Image Representations in Conjunction
with a Region Based AC (n = 50)

| AC Method | MAD ($\mu \pm \sigma$) | DSC $\mu \pm \sigma$ | $HD_{max}\ \mu \pm \sigma$ |
|---|---|---|---|
| PCA + AC | 4.87 ± 4.35 | 0.48 ± 0.24 | 10.9 ± 7.01 |
| SEAC | 4.24 ± 3.80 | 0.53 ± 0.26 | 9.76 ± 7.35 |

Example 3. Comparing Image Segmentation Strategies

A. Boundary-Based Measures

Since spectral embedding-based active contour (SEAC) performed best based on both the boundary-based and region-based AC models, spectral embedding-based active contour (SEAC) was compared to the previously published FCM+AC model using the hybrid active contour model (Shi et al., Medical Physics, 36(11):5052-5063, 2009). Table VI shows the results for the optimized hybrid models. Both FCM+AC and spectral embedding-based active contour (SEAC), and spectral embedding-based active contour (SEAC) resulted in a statistically significant improvement over FCM+AC in terms of MAD, DSC and HD max (indicated by an asterisk (*) in Table VI. The best results for the hybrid model weighted the region term at 0.4 and the boundary term at 6.4. Since the FCM segmentations degraded when the region-based term was added to the model, the optimized spectral embedding-based active contour (SEAC) is compared to the boundary-based FCM+AC.

Figure 7:
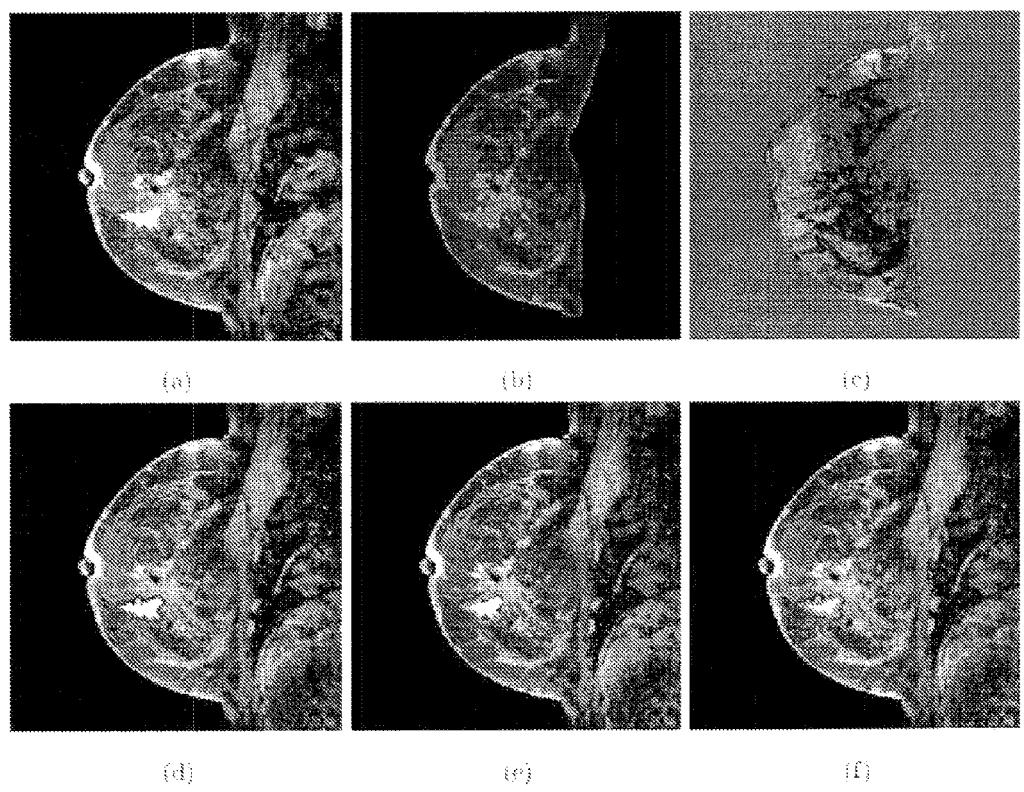
FIG. 7 shows an example of the hybrid active contour (AC) segmentation driven by fuzzy c-means (FCM) compared to SE, which show the improved segmentation using spectral embedding-based active contour (SEAC) compared to fuzzy c-means (FCM)+active contour (AC). (a) Original grayscale post-contrast image and image representations derived from (b) fuzzy c-means (FCM) and (c) SE. The second row of images show the ground truth segmentation (e) and the hybrid active contour (AC) segmentation driven by (f) the fuzzy c-means (FCM)+active contour (AC) segmentation overlaid on ground truth, and (g) spectral embedding-based active contour (SEAC) segmentation overlaid on ground truth.
Figure 8:
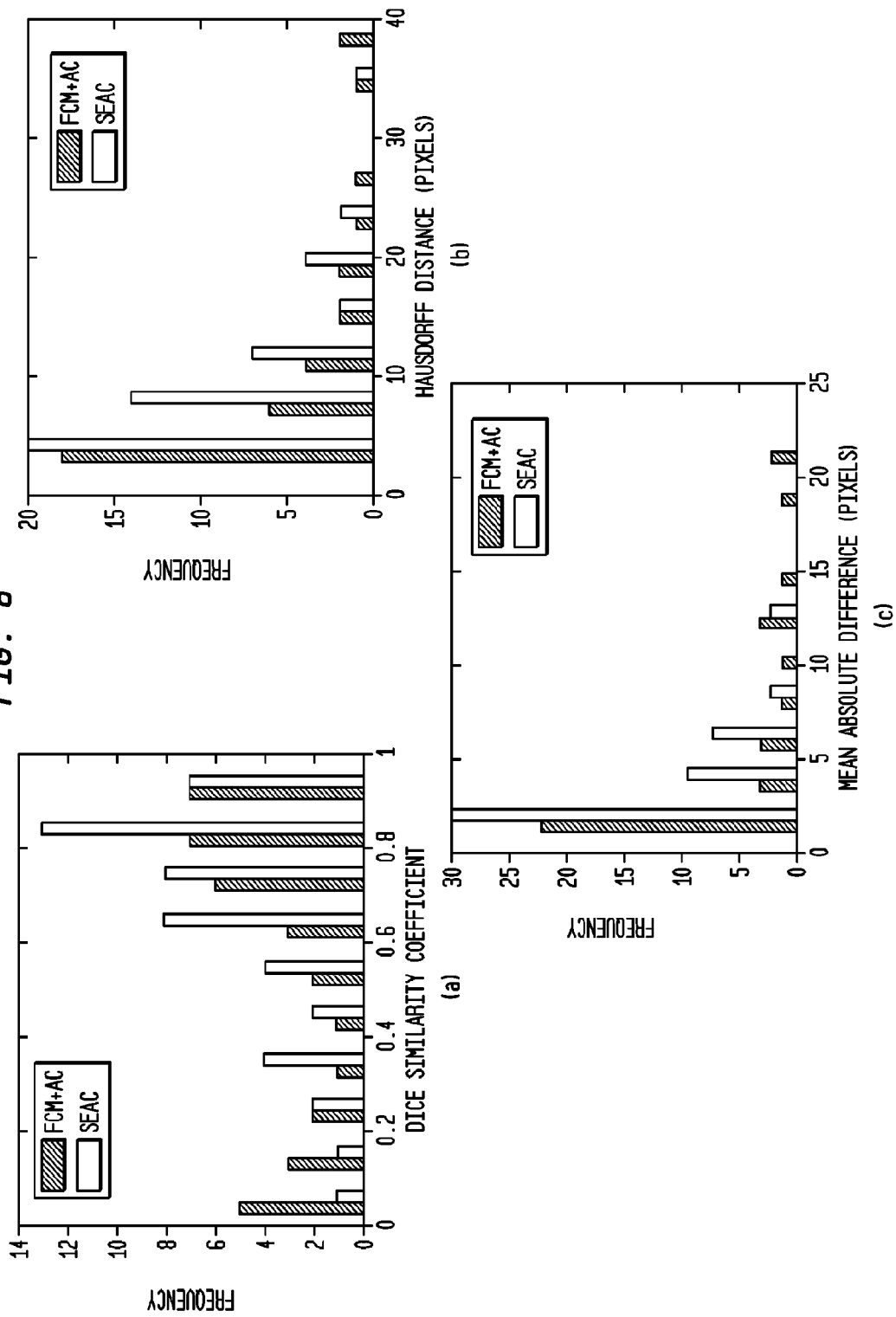
FIG. 8 shows histograms comparing the dice similarity coefficient (DSC), mean absolute difference (MAD) and maximum Hausdorff distance ($HD_{max}$) for fuzzy c-means (FCM)+active contour (AC) and spectral embedding-based active contour (SEAC). The lowest MAD and $HD_{max}$ and highest DSC values most frequently came from spectral embedding-based active contour (SEAC). (a) Dice similarity coefficient (DSC), (b) Hausdorff distance, and (c) mean absolute difference comparing fuzzy c-means (FCM)+active contour (AC) and from spectral embedding-based active contour (SEAC) to ground truth. Spectral embedding-based active contour (SEAC) shows DSC values close to 1 most of the time while showing smaller Hausdorff distances and smaller mean absolute differences, which indicates that spectral embedding-based active contour (SEAC) is better able to approximate the ground truth than fuzzy c-means (FCM)+active contour (AC) in the majority of cases.
Figure 9:
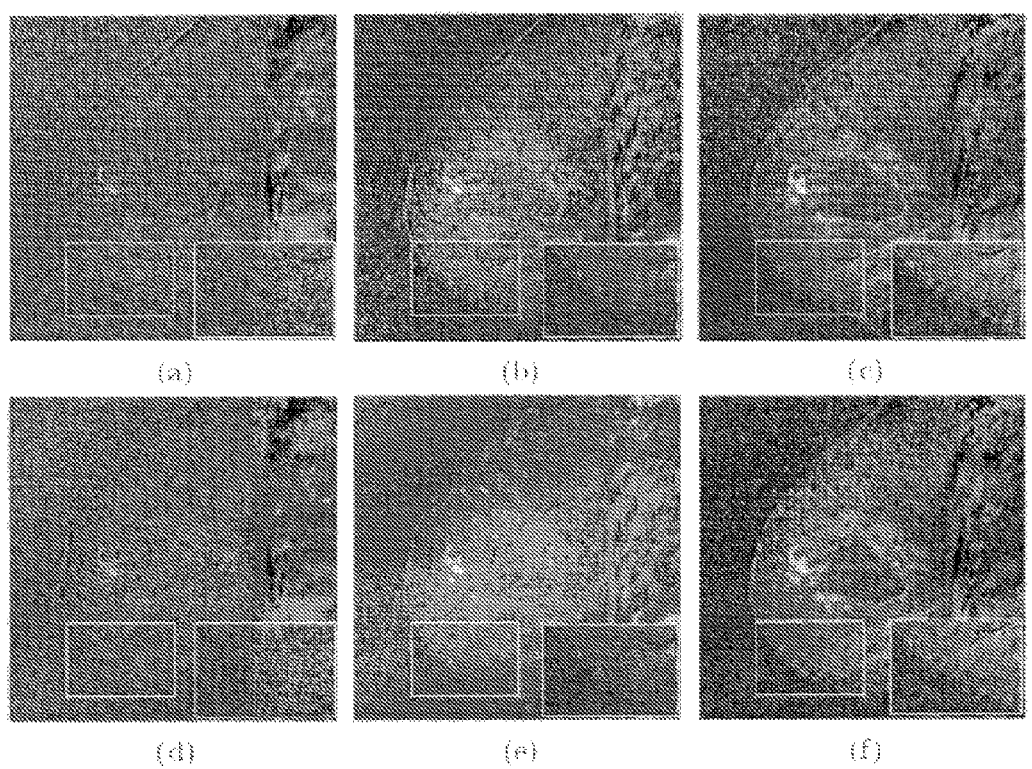
FIG. 9 shows comparison of unregistered post-contrast time point 1 (a), 2 (b), and 3 (c)) and corresponding intensity-based registered ((d), (e) and (f) subtraction images. Inset in bottom-right corner of each image highlights misalignment demonstrated by high signal intensity at breast edge. Misalignment is recovered in the first post-contrast time point and progressively gets worse as contrast agent is taken up by the breast.

In addition, a t-test was performed to test the hypothesis (1) that spectral embedding-based active contour (SEAC) more accurately approximates the ground truth segmentation in terms of MAD, HD, and DSC compared to FCM; and (2) that spectral embedding-based active contour (SEAC) demonstrates a statistically significant improvement segmentation over the popular FCM segmentation method. FIG. 7 shows an example of the hybrid AC segmentation driven by FCM compared to SE, which shows the improved segmentation using spectral embedding-based active contour (SEAC) compared to FCM+AC. It was found that when the histograms, which compared the DSC, MAD and HD max for FCM+AC and spectral embedding-based active contour (SEAC), were examined, the lowest MAD and HD max and highest DSC values most frequently came from spectral embedding-based active contour (SEAC) as shown in FIG. 8.

TABLE VI

Evaluations of Image Representations in Conjunction with a Hybrid AC (n = 50, *p < 0.05)

| AC Method | MAD ($\mu \pm \sigma$) | DSC $\mu \pm \sigma$ | $HD_{max}$ $\mu \pm \sigma$ |
|---|---|---|---|
| FCM + AC | 6.64 ± 6.37 | 0.50 ± 0.32 | 11.86 ± 10.14 |
| SEAC* | 3.37 ± 2.70 | 0.66 ± 0.22 | 8.79 ± 6.87 |

B. Classifier Accuracy

Since FCM is one of the most widely used breast lesion segmentation methods, FCM and spectral embedding-based active contour (SEAC) were compared as lesion segmentation methods from which to derive quantitative morphological features for classifying lesions as benign or malignant. Once the active contour was optimized for FCM+AC and spectral embedding-based active contour (SEAC), the best case active contour for each respective method was used to generate the lesion contours from which morphological features are extracted. Lesion classification then was performed using a support vector machine (SVM) classifier (Cortes, C. and Vapnik, V. Machine Learning, 20(3):273-297, 1995, incorporated by reference herein in its entirety) based on these automatically derived contours. The classification results using the automatically derived contours then are compared to classification driven by contours from manual segmentations. A Student's t-test, which is performed to compare the AUC for each classifier to the null hypothesis, is considered an AUC=0.5, or no difference in classification from that expected by chance (Bhooshan, M. et al., Radiology, 254(3):680-690, 2010). This is tested against the hypothesis that there is no statistical difference between the AUC derived from breast lesion classification using the spectral embedding-based active contour (SEAC) or FCM segmentation and an AUC of 0.5. Table VII shows the SVM classification AUC for 10 trials of 10-fold cross validation based on morphological features based on FCM+AC and spectral embedding-based active contour (SEAC). Spectral embedding-based active contour (SEAC) performed better than FCM+AC, and the AUC for the ROC curve for spectral embedding-based active contour (SEAC) is statistically significant compared to an AUC of 0.5 (Bhooshan, M. et al., Radiology, 254(3):680-690, 2010), whereas the AUC for FCM+AC was not statistically significantly better than an AUC of 0.5. The AUC of 0.67 for spectral embedding-based active contour (SEAC) is also comparable to the AUC for lesion diagnosis based on morphological features found elsewhere in the literature (Gilhuijs, K. et al., Medical Physics, 25(9):1647-1654, 1998).

TABLE VII

Classification Accuracy based on Automated Segmentation (n = 50, *p < 0.05)

| Segmentation Method | AUC ($\mu \pm \sigma$) |
|---|---|
| FCM + AC | 0.50 ± 0.07 |
| SEAC* | 0.67 ± 0.05 |

When using a hybrid AC model, determining the weights for each term in the energy functional is a difficult task. In the present invention, the optimal weights for the hybrid AC model were obtained by first performing the segmentations using various combinations of a predetermined range of weights. The weights that provided the best segmentations for the subset of data were used then for the entire dataset.

It was found that when the spectral embedding-based active contour (SEAC) automated segmentation results were used for morphological feature extraction, they resulted in better lesion classification than when using FCM+AC. Spectral embedding-based active contour (SEAC)'s outperforming the FCM+AC in the lesion classification task suggests that spectral embedding-based active contour (SEAC) was capable of capturing subtleties of lesion morphology that are critical to accurate lesion classification.

The classification results of the present invention also suggest that endpoint classification may be an additionally important metric for the evaluation of automated segmentation methods designed for use in conjunction with computer-aided diagnosis systems. It was also found that, for the datasets that ranged in image grid size from 384×384 to 512×512 pixels, total run-time ranged from approximately 3-12 minutes, depending on the size of the image.

Example 4. Evaluation of SERg

Table VIII shows a summary of the 4 datasets used which sum to 38 image pairs for evaluation of SERg. Synthetic brain data was generated from the MNI BrainWeb database (Kwan, R. et al., IEEE Transactions on Med. Imaging 18(11), 1085-97, 1999). Contrast dye introduced to the subject can be interpreted as noise in the images, and as such, the image without noise is considered to be the pre-contrast image. The 1st post-contrast time point is simulated by the image with 1% noise, the 2nd post-contrast time point is simulated by the image with 5% noise, and the 3rd post-contrast time point is simulated by the image with 9% noise. Image deformations were imposed using thin-plate splines (Bookstein, F., IEEE PAMI 11(6) 567-585, 1989).

TABLE VIII

Performance measures to evaluate SEAC

| Data type | Image pairs | Data description |
|---|---|---|
| Synthetic brain | 12 | 4 different image deformations, 3 different noise levels |
| Fat-suppressed breast DCE-MRI | 10 | Peak-post-, pre-contrast enhancement fat-suppression in acquisition |
| Fat-saturated breast DCE-MRI | 6 | Peak-post-, pre-contrast enhancement no fat-suppression in acquisition |

Eight 1st order statistical features along with 7 edge detection filters at a window size of 5×5 voxels are calculated for each pre- and post-contrast image. This feature set plus the original raw intensity image results in a feature vector of length 16.

A. Measures of Registration Accuracy

The registration accuracy obtained by SERg was compared to an intensity based registration, which was first proposed by Rueckert et al. (IEEE TMI 18(8) (1999) 712-721). Data was evaluated qualitatively by visual inspection of the difference image resulting from $C^{post}-C^{pre}$. Quantitative measures of registration accuracy were correlation ratio (CR) (Roche, A. et al., The correlation ratio as a new similarity measure for multimodal image registration. In: MICCAI'98, LNCS1496, Springer Verlag, 1115-1124, 1998), and NMI.

B. Quantitative Results

Figure 10:
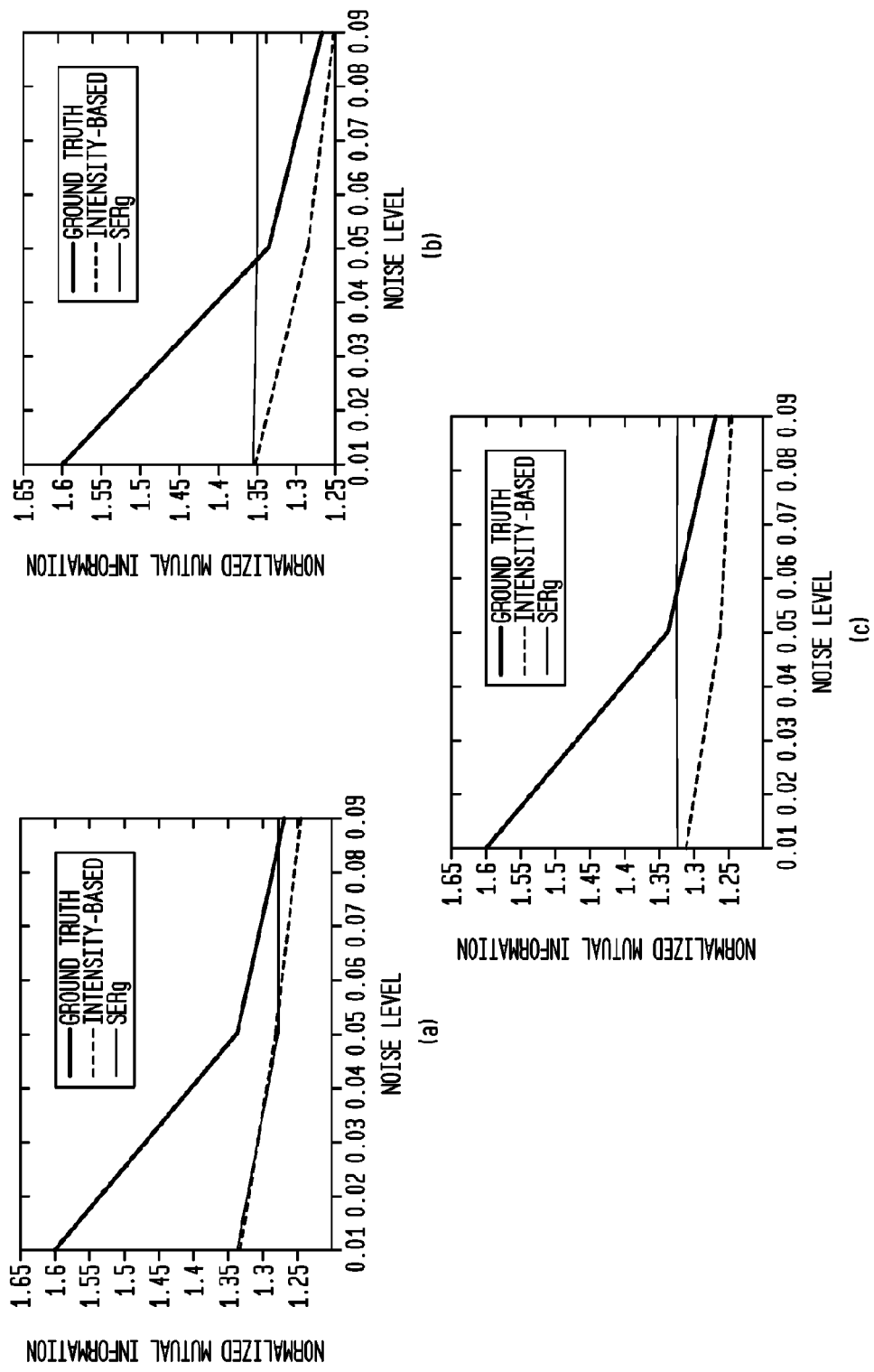
FIG. 10 shows plots of natural mutual information (NMI) as a function of noise level for 3 different deformations. The intensity-based registration results in lesser NMI as more noise is introduced into the deformed image, whereas SERg NMI remains relatively robust to noise.
Figure 11:
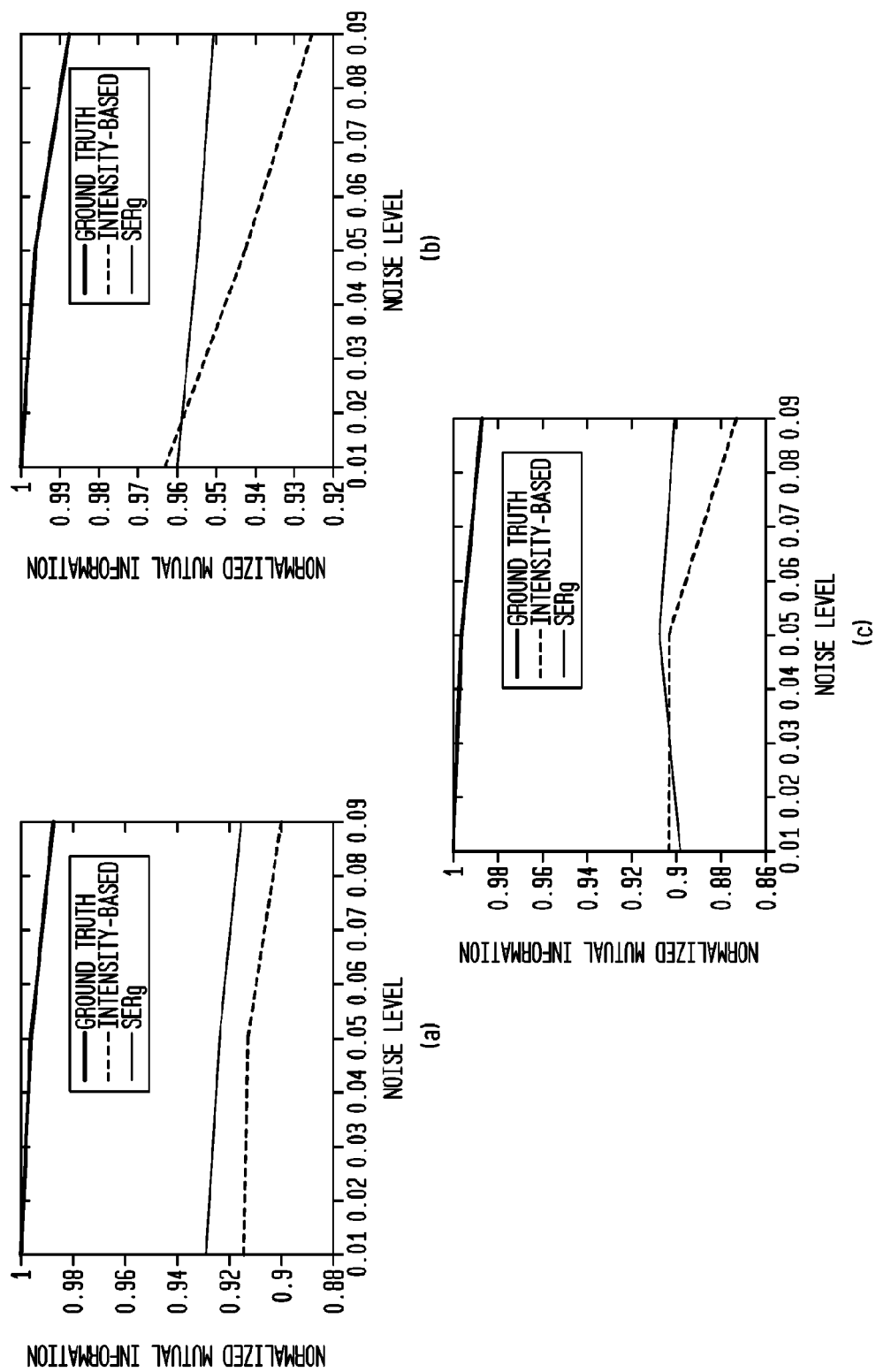
FIG. 11 shows plots of correlation ratio as a function of noise level for three different deformations. Although correlation ratio is comparable for the intensity-based registration and SERg at 1% noise, as more noise is introduced to the image, the difference in correlation ratio between intensity-based registration and SERg widens.
Figure 12:
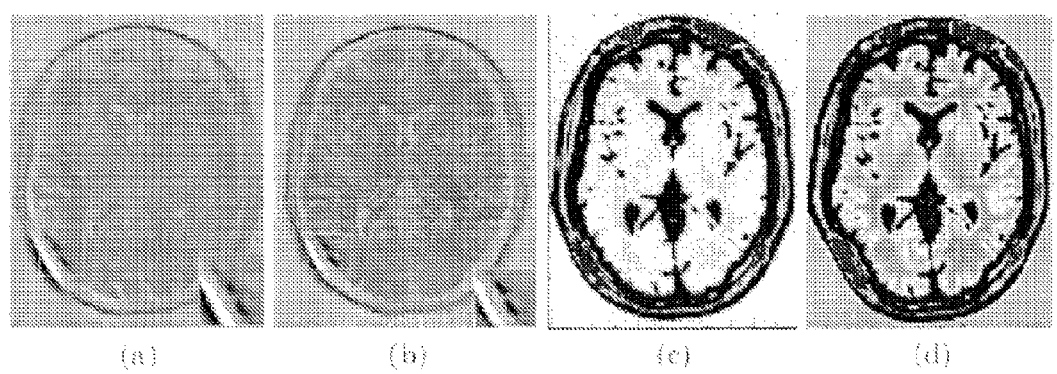
FIG. 12 shows an example of the synthetic deformation (bottom, left of image in (a, b, and d) imposed on the brain data. (a) Undeformed image subtracted from 9% noise image containing deformation. (b) Undeformed image subtracted from 9% noise image after SERg registration. Eigen image scenes of undeformed noise-free image (c) and 9% deformed image (d) after spectrally embedding in the same space.

FIGS. 10 and 11 show the results of the synthetic experiments of varied noise and deformation field. Because the images are obtained before deformation, a ground truth similarity can be calculated for each image pair. The SS-SSERg method was closer to the ground truth in terms of both NMI and CR.

C. Qualitative Results

Figure 13:
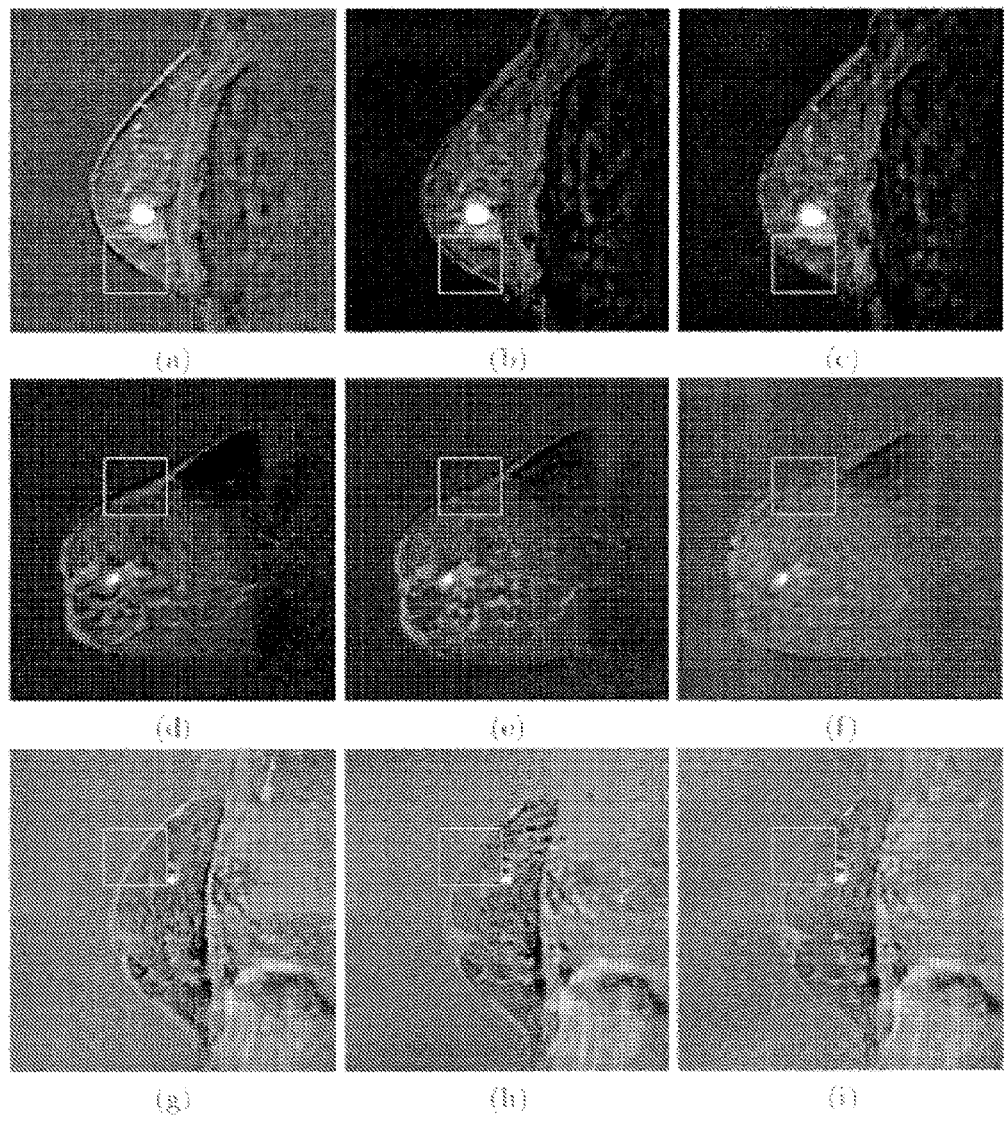
FIG. 13 shows comparison of unregistered (a, d, g), signal intensity based registration (b, e, h), and SERg (c, f, i) and difference images for three difference breast dynamic contrast-enhanced magnetic resonance imaging (DCE-MRI) datasets. Inset in bottom-right corner of each image highlights misalignment demonstrated by high signal intensity at breast edge.

FIG. 13 shows difference images for three breast DCE-MRI datasets which require registration. The difference images show that the breast border strongly enhances when images are not aligned. Although intensity-based registration seems unable to align the images (FIG. 13 (b, e, h)), SERg is able to align the images (FIG. 13 (c, f, i))

While the described invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the described invention. All such modifications are intended to be within the scope of the claims appended hereto.

We claim:

1. A method for detecting and segmenting a lesion from longitudinal, time series, or multiparametric imaging by utilizing spectral embedding-based active contour (SEAC), the method comprising:
   (a) obtaining a plurality of images from a longitudinal, time series, or multi-parametric imaging;
   (b) applying spectral embedding (SE) to the longitudinal, time series, or multi-parametric imaging in a pixel-wise fashion to reduce a plurality of time point images to a single parametric embedding image (PrEIm), wherein the spectral embedding (SE) produces three smallest eigenvectors at each pixel location in the single parametric image by presenting color values in the parametric embedding image (PrEIm);
   (c) calculating spatial tensor-based gradients on the parametric embedding image (PrEIm) derived from spectral embedding (SE) eigenvectors;
   (d) selecting a point within an object of interest in the parametric embedding image (PrEIm) to serve as an initialization for an active contour (AC) model describing boundaries of shapes in the parametric embedding image (PrEIm);
   (e) evolving the active contour (AC) model on the parametric embedding image (PrEIm), wherein the active contour model is simultaneously driven by both boundary and region information obtained from the parametric embedding image (PrEIm), wherein the evolving of the active contour (AC) model at a border between a foreground and background area of the parametric embedding image (PrEIm) stops when a gradient magnitude between the foreground and background areas is maximized and a difference between intensity distributions and region statistics for the foreground and background is maximized; and
   (f) detecting and segmenting the lesion based on morphological features derived from (e).

2. The method according to claim 1, wherein the longitudinal, time series, or multiparametric imaging comprises one or more of the following:
   dynamic contrast enhanced magnetic resonance imaging (DCE-MRI);
   T1 imaging;
   T2 imaging; and
   diffusion-weighted imaging.

3. The method according to claim 1, wherein at least one of steps (a), (b), (c), (d), (e) and (f) is performed using a computer.

4. The method according to claim 1, wherein at least one of steps (a), (b), (c), (d), (e) and (f) is performed automatically.

5. The method according to claim 1, wherein the lesion is a cancer.

6. The method according to claim 5, wherein the cancer is one or more of the following:
   a breast cancer;
   a prostate cancer;
   a brain cancer;
   a liver cancer;
   a kidney cancer.

7. The method according to claim 1, wherein the lesion is a plaque in a blood vessel.

8. The method according to claim 7, wherein the blood vessel is a carotid artery.

9. A system comprising:
   a computer comprising a computer processor; and
   a computer-readable storage medium tangibly storing thereon computer program instructions capable of being executed by the computer processor of the computing device, the computer program instructions defining the steps of;
   (a) obtaining a plurality of images from a longitudinal, time series, or multiparametric imaging;
   (b) applying spectral embedding (SE) to longitudinal, time series, or multi-parametric imaging in a pixel-wise fashion to reduce a plurality of time point images to a single parametric embedding image (PrEIm), wherein the spectral embedding produces three smallest eigenvectors at each pixel location in the single parametric image by presenting color values in the parametric embedding image (PrEIm);
   (c) calculating spatial tensor-based gradients on the parametric embedding image (PrEIm) derived from spectral embedding (SE) eigenvectors;
   (d) selecting a point within an object of interest in the parametric embedding image (PrEIm) to serve as an initialization for an active contour (AC) model describing boundaries of shapes in the parametric embedding image (PrEIm);
   (e) evolving the active contour (AC) model on the parametric embedding image (PrEIm), wherein the active contour model is simultaneously driven by both boundary and region information obtained from the parametric embedding image (PrEIm), wherein the evolving of the active contour (AC) model at a border between a foreground and background area of the parametric embedding image (PrEIm) stops when a gradient magnitude between the foreground and background areas is maximized and a difference between intensity distributions and region statistics for the foreground and background is maximized; and (f) detecting and segmenting a lesion based on morphological features derived from (a).

10. The system according to claim 9, wherein the longitudinal, time series, or multi-parametric imaging comprises one or more of the following:
dynamic contrast enhanced magnetic resonance imaging (DCE-MRI);
T1 imaging;
T2 imaging; and
diffusion-weighted imaging.

11. The system according to claim 9, wherein the lesion is a cancer.

12. The system according to claim 11, wherein the cancer is one or more of the following:
a breast cancer;
a prostate cancer;
a brain cancer;
a liver cancer;
a kidney cancer.

13. The system according to claim 9, wherein the lesion is a plaque in a blood vessel.

14. The system according to claim 13, wherein the blood vessel is a carotid artery.

15. A method for registering time series data by utilizing reduced-dimension eigenvectors derived from spectral embedding (SE) of a feature scene, the method comprising:
(a) obtaining a plurality of images from a longitudinal, time series, or multiparametric imaging;
(b) applying spectral embedding (SE) to time series data to transform a plurality of time series images into an alternative data presentation, wherein the spectral embedding (SE) places a pre-contrast image and a post-contrast image in a same embedding space and embeds eigenvectors that separate salient regions from non-salient regions in the image and identify corresponding regions in the both pre-contrast and post-contrast images;
(c) driving registration based on areas of the salient regions and the corresponding regions identified in (b); and
(d) capturing statistics of multi-dimensional data found in multiple spectral embedding (SE) eigenvectors.

16. The method according to claim 15, wherein capturing in (d) is performed using alpha-mutual information ($\alpha$-MI).

17. A system comprising:
a computer comprising a computer processor; and a computer-readable storage medium tangibly storing thereon computer program instructions capable of being executed by the computer processor of the computing device, the computer program instructions defining steps of:
(a) obtaining a plurality of images from a longitudinal, time series, or multiparametric imaging,
(b) applying spectral embedding (SE) to time series data to transform time series images into an alternative data presentation, wherein the spectral embedding (SE) places a pre-contrast image and a post-contrast image in a same embedding space and embeds eigenvectors that separate salient regions from non-salient regions in the image and identify corresponding regions in the both pre-contrast and post-contrast images,
(c) driving registration based on areas of the salient regions and the corresponding regions identified in (b), and
(d) capturing statistics of multi-dimensional data found in multiple spectral embedding eigenvectors.

18. The system according to claim 17, wherein capturing in (d) is performed using alpha-mutual information ($\alpha$-MI).

* * * * *

UNITED STATES PATENT AND TRADEMARK OFFICE
CERTIFICATE OF CORRECTION

PATENT NO. : 9,721,338 B2
APPLICATION NO. : 13/978919
DATED : August 1, 2017
INVENTOR(S) : Anant Madabhushi et al.

Page 1 of 1

It is certified that error appears in the above-identified patent and that said Letters Patent is hereby corrected as shown below:

In the Specification

Delete the paragraph under STATEMENT REGARDING FEDERALLY SPONSORED RESEARCH OR DEVELOPMENT on Column 1, Line number 21 and replace with the following:

--This invention was made with government support under grant numbers CA127186, CA136535, CA140772, and CA143991 awarded by the National Institutes of Health. The government has certain rights in the invention.--

Signed and Sealed this
Twenty-seventh Day of May, 2025

Coke Morgan Stewart
*Acting Director of the United States Patent and Trademark Office*